United States Patent [19]

Rajala et al.

[11] Patent Number: 5,806,401

[45] Date of Patent: Sep. 15, 1998

[54] SATELLITE SAWMILL WITH ADJUSTABLE SAWS AND AUTOMATIC SAWBOLT CENTERING DEVICE

[76] Inventors: Edward Rajala, P.O. Box 204, Cohasset; Alfred Siegel, 1301 Range Line Rd., Grand Rapids, both of Minn. 55721; Orie Taylor, 716 E. St. Andrews Cir., Dakota Dunes, S. Dak. 57049

[21] Appl. No.: 701,999

[22] Filed: Aug. 26, 1996

Related U.S. Application Data

[63] Continuation-in-part of Ser. No. 321,414, Oct. 11, 1994, abandoned, which is a continuation-in-part of Ser. No. 177,759, Jan. 4, 1994, abandoned.

[51] Int. Cl.$^6$ .............................. B27B 7/04; B27B 15/08; B27B 17/00
[52] U.S. Cl. ....................... 83/865; 83/404.1; 83/425.1; 83/425.2; 83/433; 83/435.11; 83/435.23; 83/708; 83/731; 83/790; 83/803; 83/808; 83/875; 144/3.1; 144/242.1; 144/250.24; 144/367; 144/378
[58] Field of Search ............... 83/420, 421, 435.1, 83/705, 707, 708, 711, 730, 731, 790, 804, 805, 806, 808, 859, 862, 865, 879, 406.1, 703, 704, 409, 425, 425.2, 425.4, 433, 435.11, 435.21, 435.23, 437.1, 803, 564, 404, 425.1, 425.3, 875, 876, 877, 404.1; 144/1.1, 3.1, 39, 340, 341, 367, 368, 369, 376, 377, 378, 242.1, 250.24

[56] References Cited

U.S. PATENT DOCUMENTS

| | | | |
|---|---|---|---|
| 1,000,210 | 8/1911 | Todd | 83/704 |
| 2,612,915 | 10/1952 | Moss | 144/72 |
| 2,708,468 | 5/1955 | Lantz | 144/208 |
| 3,318,347 | 5/1967 | Alich | 143/22 |
| 3,687,269 | 8/1972 | Fritz et al. | 83/703 X |
| 3,703,196 | 11/1972 | Hedrei | 83/806 |
| 3,771,397 | 11/1973 | Smith | 83/102.1 |
| 3,875,841 | 4/1975 | Noble et al. | 83/708 |
| 3,951,187 | 4/1976 | Chisum | 144/1 R |
| 3,960,041 | 6/1976 | Warren et al. | 83/361 |
| 4,058,150 | 11/1977 | Pennington | 144/1 R |
| 4,294,149 | 10/1981 | Olsson | 83/435.21 |
| 4,317,398 | 3/1982 | Jones et al. | 83/156 |
| 4,489,635 | 12/1984 | Cooper | 83/708 |
| 4,640,171 | 2/1987 | Jansson | 83/797 |
| 4,846,237 | 7/1989 | Wolf | 144/377 |
| 4,867,213 | 9/1989 | Bolton et al. | 144/357 |
| 4,895,197 | 1/1990 | Andersen | 144/369 |
| 5,109,899 | 5/1992 | Hendrickson | 144/378 |
| 5,441,092 | 8/1995 | Randle | 144/378 |

FOREIGN PATENT DOCUMENTS

| | | | |
|---|---|---|---|
| 526055 | 6/1956 | Canada . | |
| 2499449 | 8/1982 | France | 83/425.2 |
| 787724 | 3/1956 | United Kingdom . | |
| 2056908 | 3/1981 | United Kingdom | 83/425.2 |

OTHER PUBLICATIONS

Fast Line Saw Systems, Inc., "Proven! Over 300% Yield From 8" Diameter Logs", Oct. 1992 Issue of American Lumber & Pallet, p. 23.
TimberKing, "Model M-14 Circular Sawmill", undated.
TimberKing, "Introducing the TimberMaster Model 16 Bandmill", undated.
Woodmizer, "From Forest to Final Form" dated Nov. 1992.
Gordon Hamilton, Accountant Logs Success with Movable Sawmill, Aug. 28, 1993, Vancouver Sun.

*Primary Examiner*—Clark F. Dexter
*Attorney, Agent, or Firm*—Sand & Sebolt

[57] ABSTRACT

A sawmill for milling a length of sawbolt includes a frame and a plurality of saws movably mounted to the frame. The plurality of saws include bandsaws, edging saws, and chain saws for making various cuts necessary in the milling process. A saw positioning system is coupled to the plurality of saws for positioning the saws relative to the frame. A controller is coupled to the saw positioning system. The controller provides a saw position signal and the saw positioning system positions the saws in response to the saw position signal. A number of log positioning mechanisms are also provided.

13 Claims, 13 Drawing Sheets ns are much smaller. Thus, smaller mills

SATELLITE SAWMILL WITH ADJUSTABLE SAWS AND AUTOMATIC SAWBOLT CENTERING DEVICE

This is a continuation-in-part of U.S. patent application Ser. No. 08/321,414 filed on Oct. 11, 1994, now abandoned, which is a continuation-in-part of U.S. patent application Ser. No. 08/177,759 filed on Jan. 4, 1994, now abandoned.

BACKGROUND OF THE INVENTION

The present invention relates to sawmills. More particularly, the present invention relates to an automated two man sawmill of a portable nature. Specifically, the automated two man sawmill mills a log, saw bolt or section of a tree through a process using an automated sawmill requiring at most two sawyers where the automated sawmill includes in general a skidway or other log input means; a log rotating, centering, and transferring mechanism; a carriage assembly for holding and moving the log during milling; a plurality of saws including debris clearing saws such as chain saws, and board cutting saws such as bandsaws and circular edging saws; and motors, actuators, and controllers for driving, actuating, and controlling the sawmill.

In general, sawmills have been used for milling lengths of sawbolt for many years. Overall, sawmills typically fall into one of two categories. The first category includes large, fixed sawmills. The second category includes portable sawmills.

The large, fixed sawmills employ many people in their operation. This type of sawmill is typically built at one fixed site or location. Trees are typically cut in remote locations far removed from the sawmill and the lengths of sawbolt, in either 12 or 16 feet lengths called logs or 8 feet lengths called saw bolts, are transported to the sawmill for milling. Such large sawmills can mill enormous logs and can mill many thousands of board feet per day. However, such mills have two drawbacks. The first is their cost. Such large sawmills are very expensive, and presently cost 10 to 20 million dollars to build. The second drawback is that the large sawmills are typically fixed in location, and therefore inconvenient. The lengths of sawbolt must be transported from the logging site to the mill by trucks, which, themselves, are very costly to operate.

In recent years, many of the large trees which once occupied the forests in the United States have been harvested. Therefore, the lengths of sawbolt which lumber companies mil today are much smaller. Thus, smaller mills have obtained some practicality. Further, timber rights are often obtained by lumber companies in spotty geographic areas. In other words, a timber company may have rights to timber in one small geographic area. Once that is harvested, the timber company must move to another geographic area (where it has also obtained timber rights) to harvest more timber. These regional timber rights suit themselves to a portable sawmill.

Such a sawmill has several advantages. First, it can be moved, with relative ease, from site to site to harvest timber. Second, timber can be transported far more efficiently once it is cut into boards, rather than as raw lengths of sawbolt. Thus, the entire cost of transporting raw lengths of sawbolt from a logging site to a mill is completely eliminated.

However, small portable mills also have significant disadvantages. Such mills typically include a sawmill having a single blade. This requires many cuts to mill a length of sawbolt. Also, with a mill having a single blade, the length of sawbolt must be repositioned after each cut. This repositioning is typically done in a very inefficient manner. The length of sawbolt is first cut, then rolled onto its side, then cut again, then rolled back, then cut again. This process continues until the length of sawbolt is completely milled. However, rolling the length of sawbolt is very cumbersome, difficult and time consuming.

In addition, prior portable mills had saws that were adjustably positionable for obtaining a desired cut. However, the saws often had to be hand positioned. In other words, bolts or fasteners which hold the saws in position had to be loosened. Then the saws had to be positioned by hand very precisely to obtain a desired cut, then the bolts had to be retightened. This process was very inefficient and time consuming.

Finally, some prior portable sawmills had edging saws. An edging saw is a saw which makes a desired lengthwise edge cut in a length of sawbolt so that when a length of sawbolt is run lengthwise through the mill and cut perpendicular to the desired cut edge by large bandsaws, a board having desired dimensions is produced. However, in prior portable mills, typically only one saw existed. If additional saws existed, these saws, such as edging saws, were separately positionable from the main cutting saw. This required that, each time the main cutting saw was repositioned, the edging saws would need to be repositioned very precisely relative to the main cutting saw. Otherwise, the edge cuts would be improperly positioned relative to the main cuts. Further, the edge cuts would typically occur one at a time.

In addition, such saws are only capable of producing approximately 1200 board feet per day. All of these disadvantages made typical portable sawmills highly inefficient, and consequently highly impractical for any type of commercial use.

SUMMARY OF THE INVENTION

The present invention is an automated two man sawmill for milling lengths of cut timber which are preferably sawbolts that are approximately 100 inches in length. Its advantages include compact size, high productivity, and efficiency. The present invention is more efficient because the head sawyer can concentrate on achieving best cuts while the tail sawyer concentrates on other functions including removal and stacking of cut boards and removal of the scrap slabs and debris. Further, the tail sawyer can be given the duties of concentrating additionally on rotating, centering, and transferring the log into the cutting area.

Specifically, it is the head sawyer's primary function to operate the carriage. In contrast, it is the tail sawyer's responsibility to remove lumber and waste from the saw. In addition, the tail sawyer can assist or take over the functions involved in rotating, centering, and transferring the log from the skidway to the saws as needed to relieve the primary sawyer.

A further advantage is the stabilizer member under the saw bolt during cutting which provides safety and reduces vibration both of which result in an ability to accelerate the sawing or milling cycle.

A further advantage is that this sawmill includes two bandsaws, two pair of edger saws, and two chain saws. The sawyer therefore has eight saws at his command.

A further advantage is the ability to completely saw all of a saw bolt into cut lumber or scrap without removing the saw bolt from the carriage.

A further advantage of this sawmill is that it uses two bandsaws simultaneously. These sawmills are better than circular saws which make wide cuts. Bandsaws have a blade thickness of as little as 0.0038 inches and therefore remove a very small amount of wood during cutting. In contrast, circular saws remove typically ¼ of an inch for each cut. This minimal wood removal results in maximum recovery of boards from the log. It is estimated that this cut savings would result in an additional board per saw bolt which at for instance 200 logs per day equates to an additional 200 boards per day.

Additionally, these maximum recovery bandsaws when coupled with two edger saws each results in a sawmill with maximum recovery board recovery and minimum wood waste.

The present invention is specifically a sawmill for milling a length of sawbolt having a first end and a second end and a longitudinal axis running generally between the first and second ends. The sawmill has a frame. The sawmill has a sawbolt providing mechanism adjacent to the frame for supplying lengths of sawbolt to be mailed. The sawmill has a sawbolt rotation mechanism that is mounted on the frame for rotating the length of sawbolt about its longitudinal axis. The sawmill has a sawbolt engaging, transferring and centering mechanism for adjustably centering the length of sawbolt and transferring the length of sawbolt into the sawmill. The sawmill has a sawbolt securing mechanism for securably and rotatably supporting and holding the length of sawbolt during the milling process. The sawmill has a carriage movably mounted within the frame with the carriage being mounted for movement along a cutting path. The sawmill has a carriage positioning mechanism that is coupled to the frame and the carriage for moving the carriage along the cutting path relative to the frame and relative to the first and second bandsaws. The sawmill has a first bandsaw movably mounted to the first bandsaw frame. The sawmill has a second bandsaw movably mounted to the second bandsaw frame, and movably mounted in relation to the first bandsaw. The sawmill has a bandsaw positioning mechanism for causing movement of the first and second bandsaws relative to the carriage and relative to the other of the first and second bandsaw. The sawmill has a first edging saw coupled to and non-planar with the first bandsaw and having a pair of substantially parallel circular saw blades the first edging saw movable along with the first bandsaw to which it is coupled. The sawmill has a second edging saw coupled to and non-planar with the second bandsaw and having a pair of substantially parallel saw blades the second edging saw movable along with the second bandsaw to which it is coupled. The sawmill has a debris and rock removing mechanism for removing debris and rocks from the length of sawbolt during the milling of the length of sawbolt by the bandsaws. The sawmill has a controller that is coupled to the sawbolt providing mechanism, the sawbolt rotation mechanism, the sawbolt engaging, transferring and centering mechanism, the sawbolt securing mechanism, the carriage, the carriage positioning mechanism, the bandsaws, the bandsaw positioning mechanism, the edging saws, and the debris and rock removing mechanism.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein.

DETAILED DESCRIPTION OF THE PREFERRED EMBODIMENTS

Figure 13:
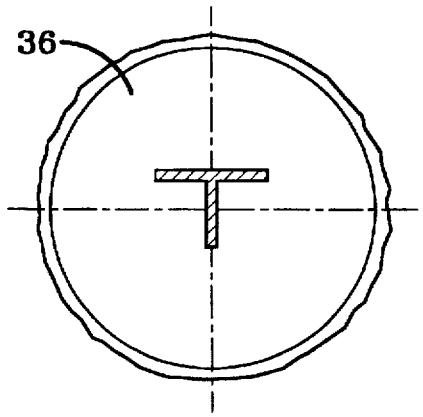
FIG. 13 shows the first embodiment of the telescoping end as is shown in FIGS. 1–7.
Figure 11:
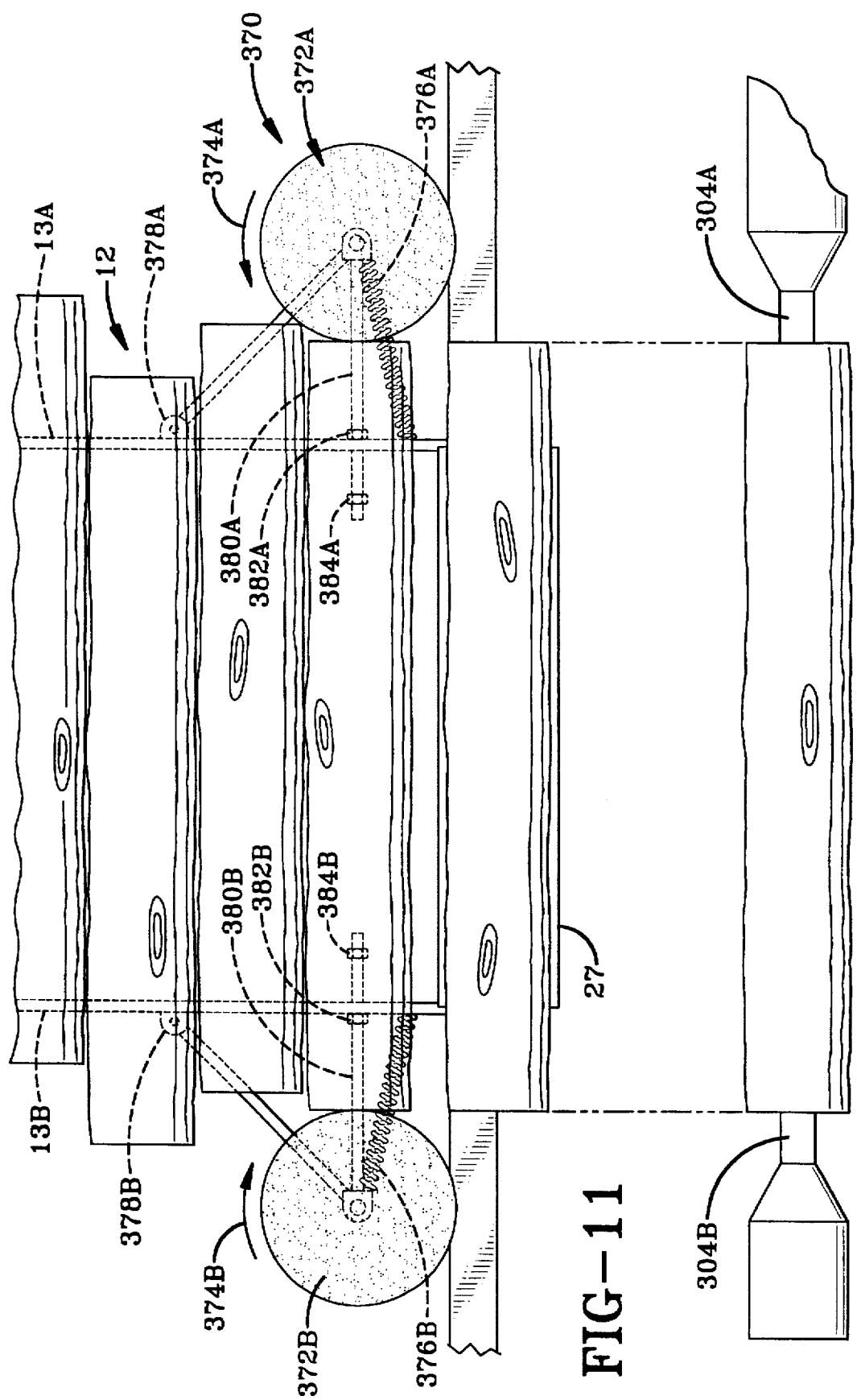
FIG. 11 is a top view of the skidway portion of the sawmill with log alignment mechanism.
Figure 14:
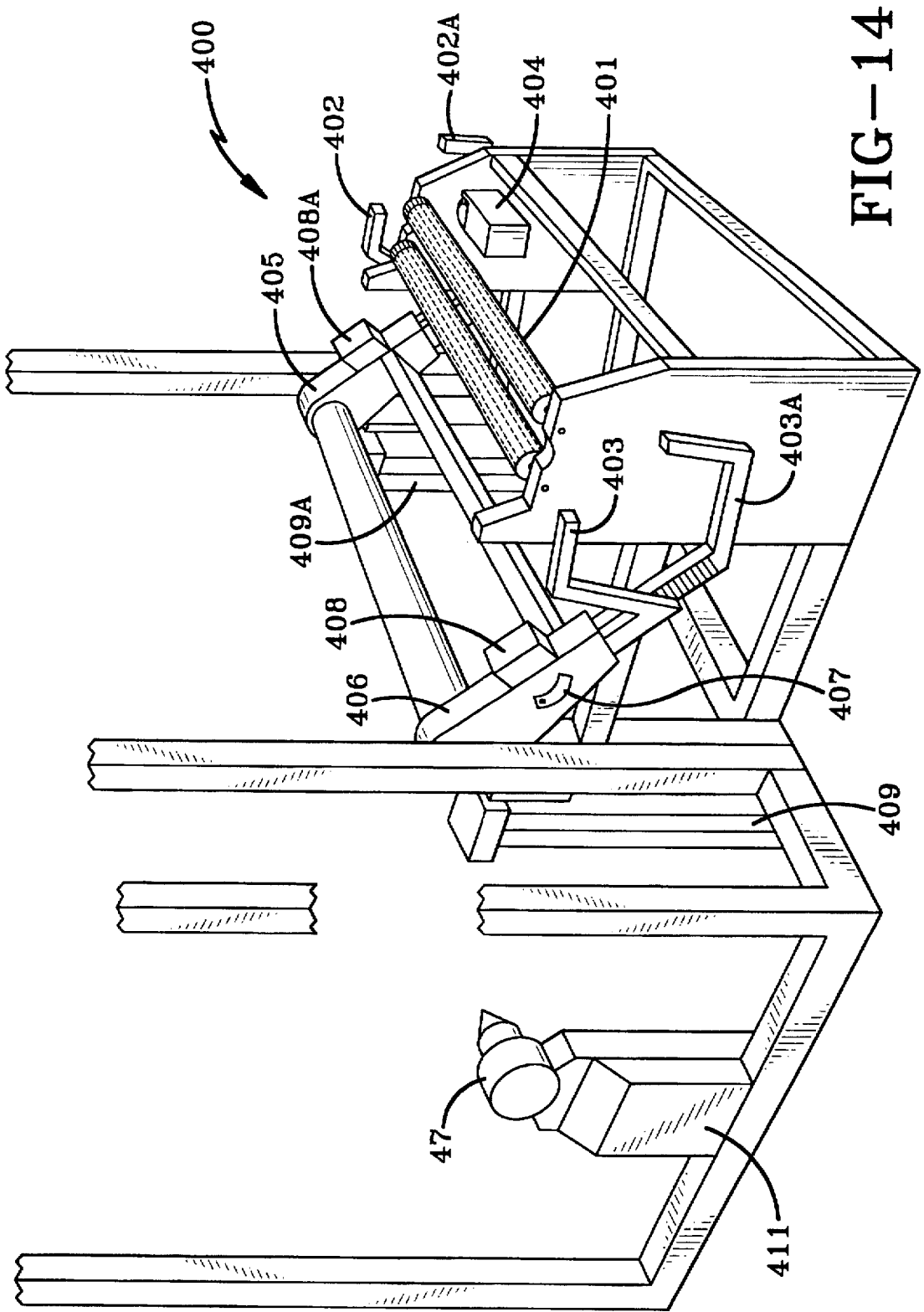
FIG. 14 shows a portion of a third embodiment of a sawmill, specifically it shows the log rotating, transferring and centering mechanism in a first position; and, FIG. 15 shows the sawmill of FIG. 14 where the log rotating, transferring and centering mechanism in a second position.
Figure 15:
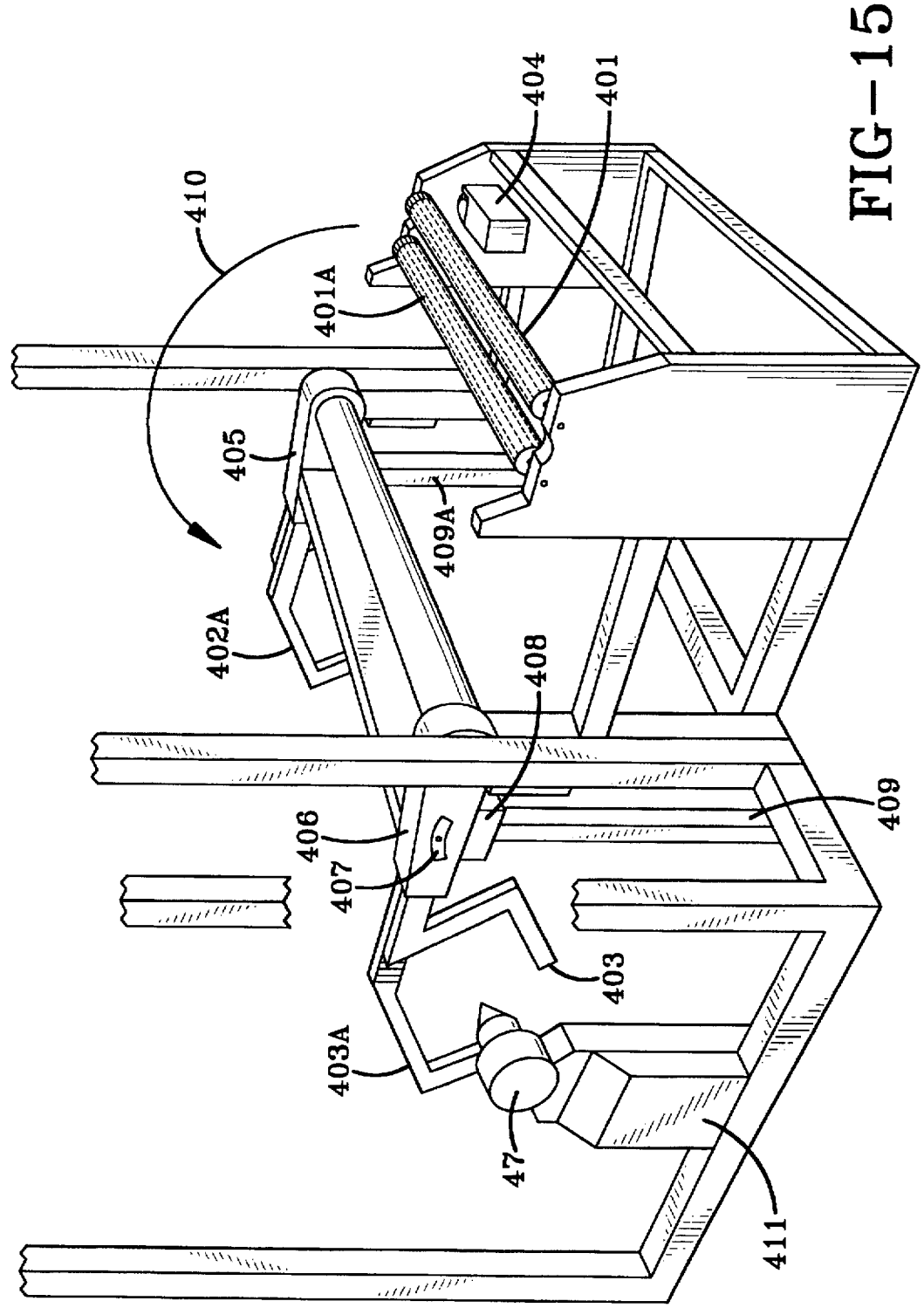

Referring now to the drawings wherein the showings are for the purposes of illustrating the preferred embodiment of the invention only and not for purposes of limiting same, the overall arrangement of a number of constructions of a sawmill can best be understood by reference to the various embodiments shown in the figures. Specifically, three embodiments are disclosed, namely a first embodiment in FIGS. 1–7, a second embodiment as shown in FIGS. 8–13 modifying the first embodiment, and a third and preferred embodiment as shown in FIGS. 14–15. The preferred construction of the sawmill can best be understood by reference to a preferred embodiment as is partially shown in FIGS. 14–15 as combined with various elements of FIGS. 1–13 as described below.

First Major Embodiment

The sawmill 10 of the first embodiment as shown in FIGS. 1–7 includes a conveyance skidway 12, a carriage 14, a first and a second bandsaw assembly 16 and 18, respectively, a pair of winches 20 and 22, respectively, a control panel 24, a scrap wood holder 26, and a rotating assembly or holder 27.

Saw bolts are introduced into sawmill 10 by conveyance skidway 12. The saw bolts may have a diameter of as large as approximately 36 inches, although it is believed that logs of up to 20 inches in diameter will be more suitable. In one embodiment, the skidway 12 is driven by a motor (not shown) using axles with gears that drive chains 13A and 13B with conveyor means thereon so that the saw bolts are moved adjacent frame 30 of sawmill 10 and positioned there for milling as needed. The next saw bolt to be milled is positioned in saw bolt rotating holder 27 by skidway 12. Skidway 12 is typically in a horizontal position such that the saw bolts thereon roll or move only when the conveyor means is driven by drive chains 13A and 13B, although some slight slope toward the sawmill may be introduced. This skidway is similar to one that is standard in the industry and has a start-stop feature controlled by one of the sawyers, typically the tail sawyer.

Figure 5:
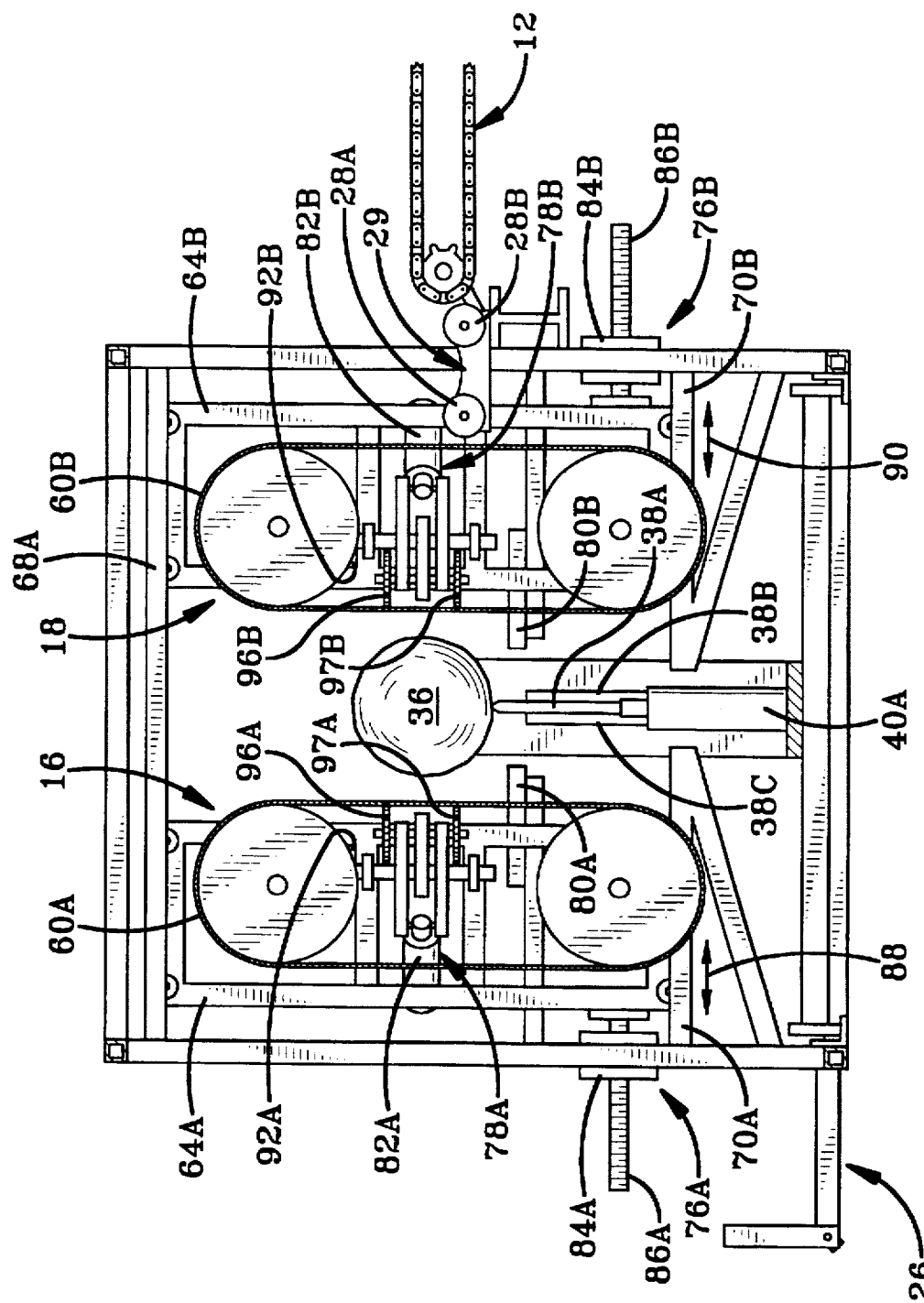
FIG. 5 is a sectional end view of the sawmill shown in FIGS. 1, 2 and 3.
Figure 7:
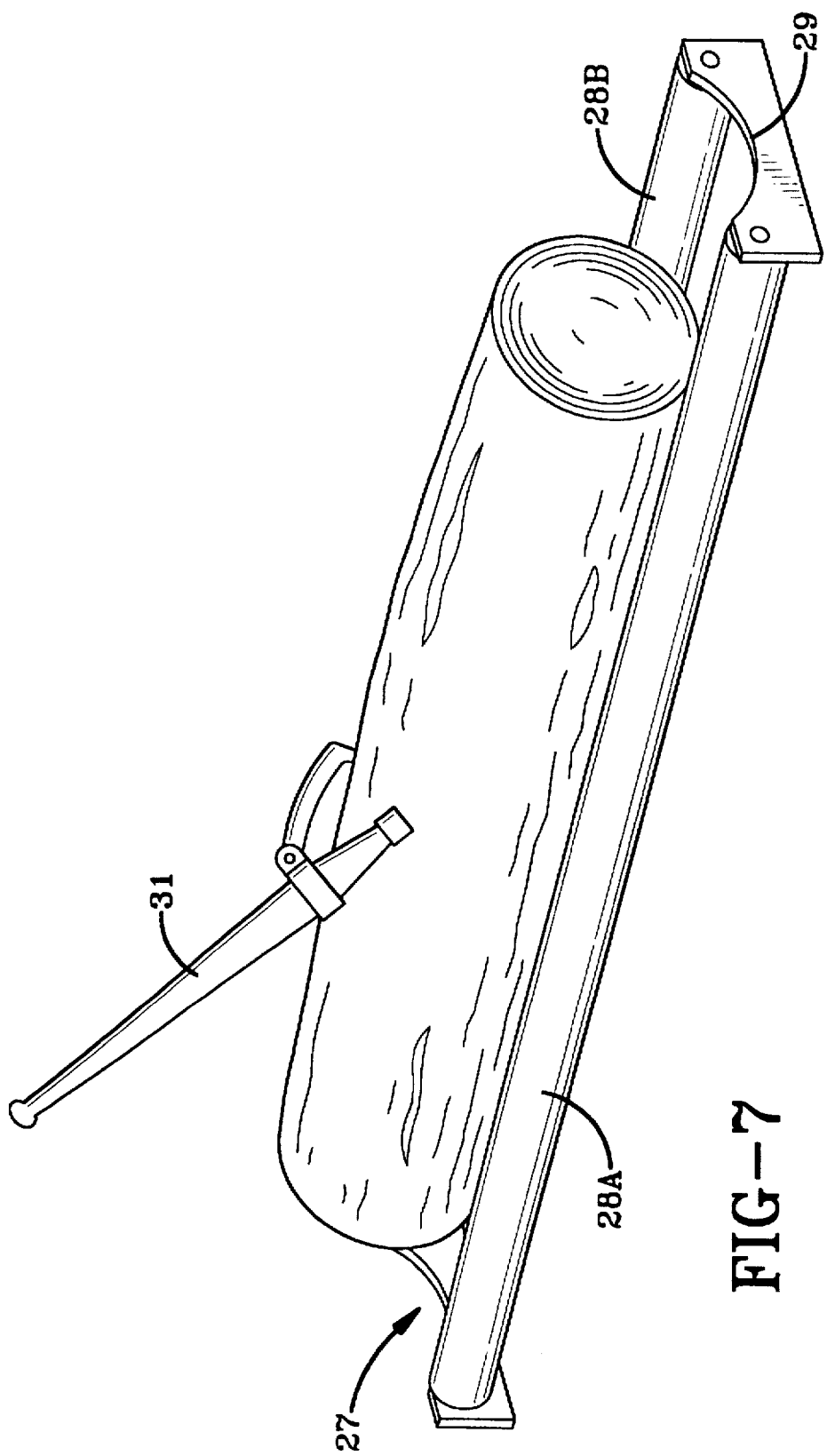
FIG. 7 is a perspective view of the saw bolt rotating holder.

The saw bolt rotating holder 27, which is shown in more detail in FIGS. 5 and 7, is positioned at the end of skidway 12 such that a saw bolt on skidway 12 rolls off of the skidway and onto saw bolt rotating holder 27 when the skidway is accordingly started and stopped to advance one saw bolt. Saw bolt rotating holder 27 includes rollers 28A and 28B which are positioned in an indentation 29 in holder 27. Rollers 28A and 28B are used to rotate the saw bolt positioned thereon so that the saw bolt can be turned to an optimal engaging position for milling. This optimal milling position may be based upon the contour of the saw bolt since the saw bolt may includes crooks, notches, or other imperfections that need to be adjusted for. The saw bolt is rotated on rollers 28A and 28B either using a cant hook 31 which engages the saw bolt and is used to rotate the saw bolt, or by a gearing mechanism (not shown) attached to holder 27 which rotates rollers 28A and 28B as directed by control panel 24. Basically, the assembly 27 aligns, rotates, centers, etc., so that the saw bolt is properly positioned, and then transfers the saw bolt to a position where the carriage engages the saw bolt. The saw bolts may have a diameter of as large as approximately 36 inches, although diameters of around 20–24 inches are most likely preferred.

The operator of sawmill 10, typically referred to as the "head sawyer", stands adjacent the control panel 24. Control panel 24 includes a controller (such as a digital computer) or microprocessor for controlling the motors and actuators of sawmill 10. All three embodiments of this sawmill are designed such that only one or two sawyers (if two, a head sawyer located at the control panel and a tail sawyer at various different locations during operation including adjacent scrap wood holder 26 to separate scrap from boards) are required to operate the complete sawmill.

The tail sawyer controls skidway 12 and rotating holder 27 as described above to assure a constant supply of wood is present. The head sawyer further controls winch 20 from control panel 24 causing the winch to move along slide 32 in the directions indicated by double-headed arrow 33. The head sawyer starts the sawmill process by sliding winch 20 toward first skidway 12. Once winch 20 is moved to a point adjacent first skidway 12, one of the sawyers, typically the head sawyer, controls winch 20 to disengage or open a set of jaws 224 and 226. The head sawyer then lowers the jaws 224 and 226, to engage a saw bolt on first skidway 12. When jaws 224 and 226 are properly positioned around a saw bolt, the head sawyer closes jaws 224 and 226 and thus securely engages that saw bolt. The head sawyer raises jaws 224 and 226 and controls winch 20 to move back to the middle of frame 30 of sawmill 10 with a saw bolt engaged in the winch. As is shown in the FIGS., specifically FIG. 6, the opening and closing, and the movement of the jaws and winch are hydraulically driven, although other methods such as electric motors are well within the equivalents that would function the same.

Once winch 20 is in position generally at the center of frame 30 along slide 32, that sawyer controls winch 20 to lower jaws 224 and 226 so that the saw bolt is lowered to carriage assembly 14, more particularly so that it rests upon a support member 38, which is part of carriage assembly 14. Carriage assembly 14 includes support member 38, a pair of hydraulic pistons, 40A and 40B, a carriage 44, an electrically controllable drive motor 46, a gear drive box 47, bearings 48 (see FIG. 2), and a pair of telescoping ends, 50A and 50B (see FIG. 2), for engaging the saw bolt 36 positioned between them.

Figure 6:
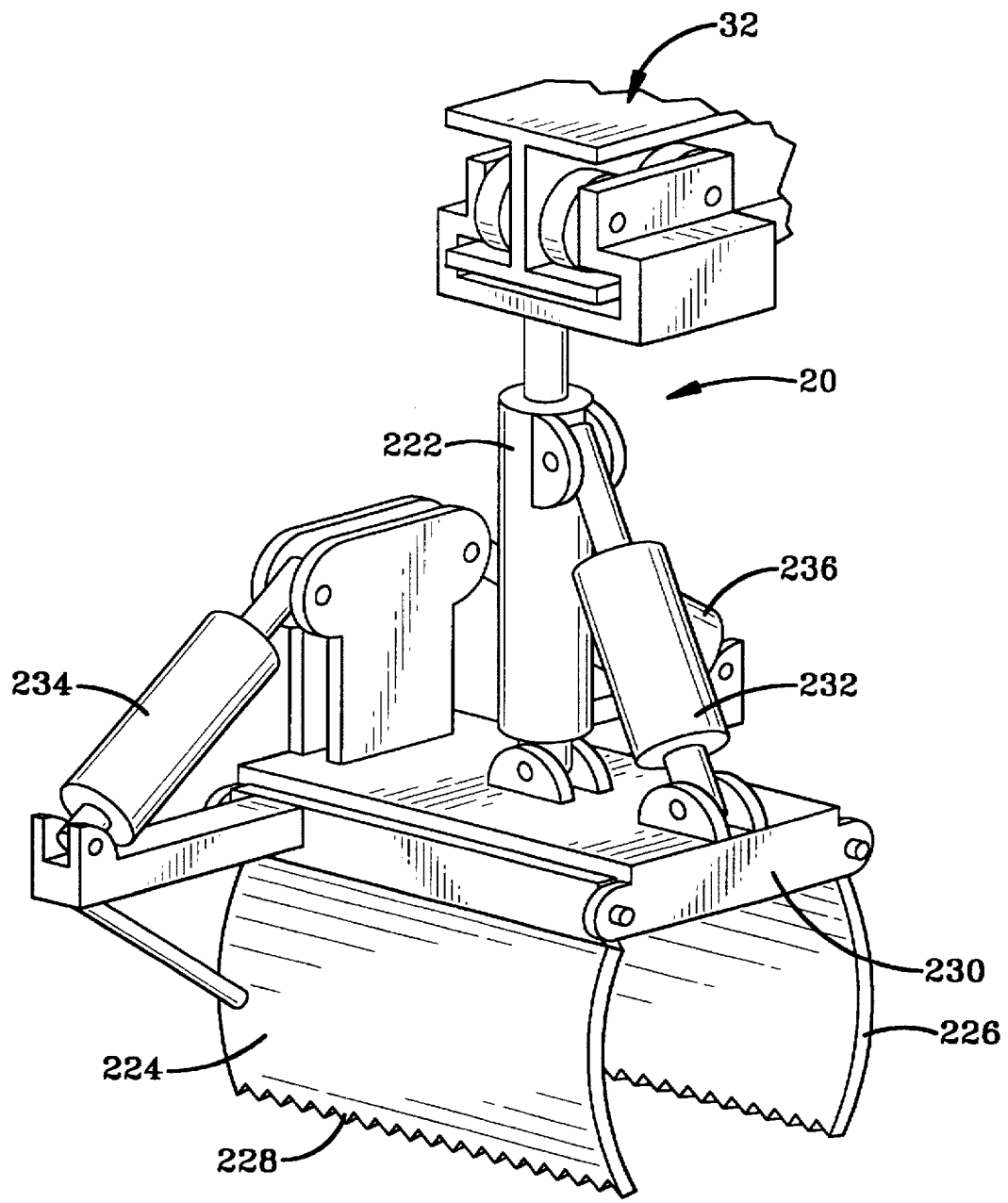
FIG. 6 is an enlarged perspective view of the winch for loading saw bolts.

The winch 20 is shown in more detail in FIG. 6 which shows winch 20 slidably attached to slide 32. Winch 20 includes a vertically actuatable cylinder 222 that is slidably connected to slide 32. Cylinder 222 is extendable in a vertical direction so that a saw bolt can be engaged by a pair of jaws 224 and 226 when the saw bolt is positioned in saw bolt rotating holder 27. Each of the jaws 224 and 226 have a plurality of teeth 228 for engaging a saw bolt.

Winch 20 in more detail, has a jaw attachment base 230 upon which jaws 224 and 226 rotate from an open position where a saw bolt can be received to a closed or nearly closed position where the saw bolt is engaged by teeth 228. Jaw attachment base 230 is vertically adjustable by cylinder 222. Leveling device 232 adjusts jaw attachment base 230 with jaws 224 and 226 so that winch 20 properly engages the saw bolt. Jaws 224 and 226 have jaw rotation devices 234 and 236, respectively attached between the jaws and jaw attachment base 230 so that the sawyer using control panel 24 may signal to jaw rotation devices 234 and 236 to move jaws 224 and 226 from an open position to a nearly closed position thereby clamping a saw bolt therebetween, and from the nearly closed position to an open position thereby releasing the saw bolt when it is positioned and engaged between telescoping ends 50A and 50B.

Support member 38 consists of three iron plates, namely a center support 38A, and two supplemental supports 38B and 38C (see FIG. 5). Center support 38A is a thin iron plate, preferably ¼ inches thick and approximately ten feet long and 24 inches high, with a serrated upper edge that comes into contact with the lower portion of saw bolt 36. Supplemental supports 38B and 38C are welded to the carriage and are an integral part of the main frame of the carriage, where each supplemental support, 38B and 38C is ¼ inch thick and approximately ten feet long and 20 inches high. Supplemental supports 38B and 38C box in center support 38A. Overall, support member 38 selectively provides substantial support for saw bolt 36 during milling.

Once saw bolt 36 is resting upon support member 38, the operator then actuates pistons 40A and 40B, which are air cylinders, although hydraulics or other actuators may be used, so that quick actuation and release is offered, to raise or lower support member 38A so that saw bolt 36 is generally between telescoping end 50A and telescoping end 50B. Both telescoping ends 50A and 50B are T-shaped, and include either a hydraulic piston or an electrically positionable actuator, with means, such as a number of spikes or teeth which typically stick out ¼ of an inch from the end, for sinking into, and engaging saw bolt 36. These T-shaped telescoping ends are discussed in more detail later in this application.

The head sawyer operates control panel 24 to cause the telescoping ends 50A and 50B to engage the respective ends of saw bolt 36. Once the saw bolt 36 has been engaged, the head sawyer disengages or opens jaws 224 and 226 and is then ready to operate sawmill 10 to mill saw bolt 36.

Carriage 44 has wheels, 52, which run in tracks, 54 and 56. Also, carriage 44 is connected, via a cable and pulley assembly, to winch 22. Winch 22 is electrically controllable by the sawyer rough control panel 24. In order to mill saw bolt 36, the head sawyer operates winch 22 to move carriage assembly 14 toward bandsaw assemblies 16 and 18 in the direction indicated by double-headed arrow 58.

It should also be noted that winch 22 can alternatively be replaced by a hydraulic feed unit. Such a hydraulic feet unit preferably drives carriage assembly 14 at a rate of approximately 60 feet per minute during cutting, and approximately 70 feet per minute during non-cutting or returning movement. In addition, bandsaws 60A and 60B are at least two inch wide bandsaws and preferably four inches wide. This provides the ability to sharpen the bandsaws a large number of times before they need to be replaced.

Prior to moving carriage 44 toward bandsaw assemblies 16 and 18, the head sawyer must first position bandsaw assemblies 16 and 18. Bandsaw assemblies 16 and 18, as shown in FIGS. 1, 2, 3 and 5, include bandsaws, 60A and 60B, saw support frames, 64A and 64B, upper bearing tracks, 68A and 68B, lower front bearing tracks, 70A and 70B (best shown in FIG. 5), lower rear bearing tracks 71A, where the other one is not shown, bandsaw motors, 74A and 74B, bandsaw positioning devices, 76A and 76B (see FIG. 5), edging saws, 78A and 78B (see FIGS. 3 and 5), edging positioning devices, 82A and 82B (see FIG. 3), and edging saw motors, 92A and 92B (see FIG. 1).

The bearing tracks 68A, 68B, 70A, 70B, 71A and the second lower rear bearing track (not shown) are all tracks with bearings thereon for allowing the attached bandsaw assemblies 16 and 18 to slide. FIG. 5 shows that lower front bearing tracks 70A and 70B and the lower rear bearing tracks 71A and the second lower rear bearing track (not shown) are raised above the base portion of frame 10. In that way, carriage assembly 14 passes beneath and in between tracks 70A and 70B when carriage assembly 14 is moved along the cutting path.

In one embodiment, bandsaws 60A and 60B are preferably equipped with four inch wide saw blades, however, various other dimensions are contemplated and would function equivalently. Motors 74A and 74B, each preferably 40 horsepower motors, are coupled to power bandsaws 60A and 60B, respectively.

As best seen in FIG. 5, the head sawyer controls the position of bandsaw assemblies 16 and 18 by controlling positioning mechanisms 76A and 76B, respectively. The positioning mechanisms in one embodiment are gear driven, such as by ballscrews, using a motor, or in another embodiment are hydraulic or air compressed cylinders. In the embodiment shown in the Figures, positioning mechanisms 76A and 76B (best seen in FIG. 5) are servo motors 84A and 84B, respectively, with ballscrew drive attachments 86A and 86B, respectively, at the output ends of the servo motors. The ballscrew attachments 86A and 86B are attached to the frames 64A and 64B of bandsaw assemblies 16 and 18, respectively. As the servo motors 84A and 84B in positioning mechanisms 76A and 76B are driven, the stems of the ballscrew attachments 86A and 86B are driven inward or outward to drive the corresponding bandsaw assemblies 16 or 18 in the direction indicated by double-headed arrows 88 and 90. The controller in control panel 24 is coupled to the servo motors 84A and 84B through a well-known feedback system so that the controller (which may include a digital computer or microprocessor) through control panel 24 is capable of tracking the position of bandsaw assemblies 16 and 18. Therefore, when the head sawyer desires to change the position of bandsaw assemblies 16 and 18 thereby determining the location and width of the next cut, the head sawyer simply enters the desired position at control panel 24, and the controller controls the servo motors 84A and 84B in positioning mechanisms 76A and 76B to actuate the ballscrew device to a desired position so that bandsaw assemblies 16 and 18 are positioned where the head sawyer wishes.

Once bandsaw assemblies 16 and 18 are positioned properly, the head sawyer activates control panel 24 to position edging saws 78A and 78B in either the cutting or non-cutting position. Edging saws 78A and 78B are coupled to the frames 64A and 64B, respectively, of bandsaw assemblies 16 and 18, respectively, in a pivotable connection.

Edging saws 78A and 78B each include motors 92A and 92B respectively, and a pair of saw blades, more particularly edging saw 78A has an upper edger saw blade 96A and a lower edger saw blade 97A, while edging saw 78B has an upper edger saw blade 96B and a lower edger saw blade 97B. Motors 92A and 92B can be any suitable electric motor for driving saw blades 96A and 97A, and 96B and 97B. Saw blades 96A and 97A are two circular saw blades located in generally parallel planes, while saw blades 96B and 97B are two circular saw blades located in generally parallel planes, where all four blades are for edging saw bolt 36.

The edging saws 78A and 78B can pivot using positioning means 82A and 82B into a cutting position or a non-cutting position, as desired by the head sawyer. Saw blades 96A and 97A are pivotably mounted relative to motor 92A while saw blades 96B and 97B are pivotably mounted relative to motor 92B so that pairs of saw blades 96A and 97A, and 96B and 97B can be rotated into a cutting position, or into a non-cutting position (shown in FIG. 1). Rotation is accomplished by positioning means 82A and 82B, which are preferably as shown in the Figures, a pair of hydraulic pistons. Alternatively rotation can occur using either a pair of electric motors, or by manual manipulation by the sawyer.

If rotation is driven by hydraulic pistons, a small piston would be coupled to the axis of rotation of the saw blade and to the bandsaw assembly, where the hydraulic piston is actuatable by the sawyer at control panel 24. The same coupling arrangement is preferable if the pivoting is driven by an electric motor. If pivotable by hand manipulation, edging saws are simply hinged for rotation and lockable into both the cutting position and the non-cutting position. Motors 74A and 74B and motors 92A and 92B are coupled to frames 64A and 64B, respectively, by mounting brackets.

The two edger saws 96A and 97A, and 96B and 97B on each edging saw assembly respectively, are preferably adjustable with respect to one another so that they can move in a range of typically between four inches apart and eight inches apart. The following suggested procedure results in the widest possible board recovery from the saw bolt.

After the saw bolt to be cut is in place, a couple of initial log squaring cuts are made. Specifically, the first cut made by bandsaws 60A and 60B will result in two (2) slabs, that is, two vertical cuts are made resulting in two parallel planar faces on the saw bolt where the all of the bark and some wood along the cut line is removed. A second cut is then made by bandsaws 60A and 60B parallel to these planar faces. The second cut includes cutting by edging saw blades 96A, 97A, 96B and 97B. The center support 38A of support member 38 drops away from the saw bolt and the saw bolt is rotated 90° (¼ turn).

The center support 38A of support member 38 is then re-attached to or re-abutted against the saw bolt. The first and second cuts are then repeated on the reoriented saw bolt thereby resulting in a substantially square timber. After the completion of the preceding saw cuts, assuming the diameter of the saw bolt is 13" (which is fairly average), the resulting product at this stage will be a square timber 8"×8" square. The 8"×8" square timber can now be sawed into boards using only bandsaws 60A and 60B. The edging saws are then deactivated and returned to their stand-by position. The last board will be 2" thick.

In an alternative embodiment, the support portion is eliminated. Also, when the support portion is in use but a saw bolt 36 is not situated therebetween, end 50B which in some embodiments is not driven, is electronically rotated so as to remain in a corresponding orientation with T-shaped end 50A.

In more detail, once the edging saws 78A and 78B are positioned in the desired cutting or non-cutting position which as stated above is typically non-cutting for the first bandsaw cut followed by cutting for the second bandsaw cut and then non-cutting thereafter, the head sawyer then programs the controller in control panel 24 to activate the motor which controls winch 22. The head sawyer controls winch 22 to move carriage assembly 14, and consequently saw bolt 36, toward bandsaw assemblies 16 and 18 along the cutting path defined by double-headed arrow 58. As winch 22 pulls saw bolt 36 along cutting path 58, bandsaws 60A and 60B, cut saw bolt 36, and edging saws 78A and 78B edge saw bolt 36 if in a cutting position.

After the each bandsaw cut and edge cut are completed, the head sawyer controls winch 22 to move carriage assembly 14 back towards control panel 24 along cutting path 58. In this preferred embodiment, bandsaws 60A and 60B are single edge bandsaws.

At any time during the milling of saw bolt 36, when the head sawyer wishes to rotate saw bolt 36 about its longitudinal axis, the sawyer head controls motor 46, which is either a servo motor or a stepper motor with a known position feedback circuit. The feedback circuit is coupled to the controller at control panel 24 so that the controller can determine the position of saw bolt 36, and via the controller in control panel 24, the sawyer can rotate saw bolt 36 a desired number of degrees. Prior to rotating saw bolt 36, the sawyer controls pistons 40A and 40B, which are typically powered by air or hydraulic fluid, to lower the center support 38A so that it no longer contacts saw bolt 36. The sawyer then controls motor 46 and gear drive box 47 which through telescoping end 50A rotates saw bolt 36 a desired number of degrees. Bearings 48 at the opposite end of the saw bolt allow telescoping end 50B to rotate correspondingly. The sawyer then controls pistons 40A and 40B so that center support 38A of support member 38 is again positioned under, and contacts, saw bolt 36 after it has been rotated. The sawyer then again controls winch 22 to move carriage assembly 14, and saw bolt 36, toward bandsaw assemblies 16 and 18 along cutting path 58. The sawyer continues this action until saw bolt 36 has been milled to a desired degree.

A further advantage of this sawmill is that it is all one compact unit with the exception of a power plant such as a 200 to 300 horsepower diesel motor.

Figure 1:
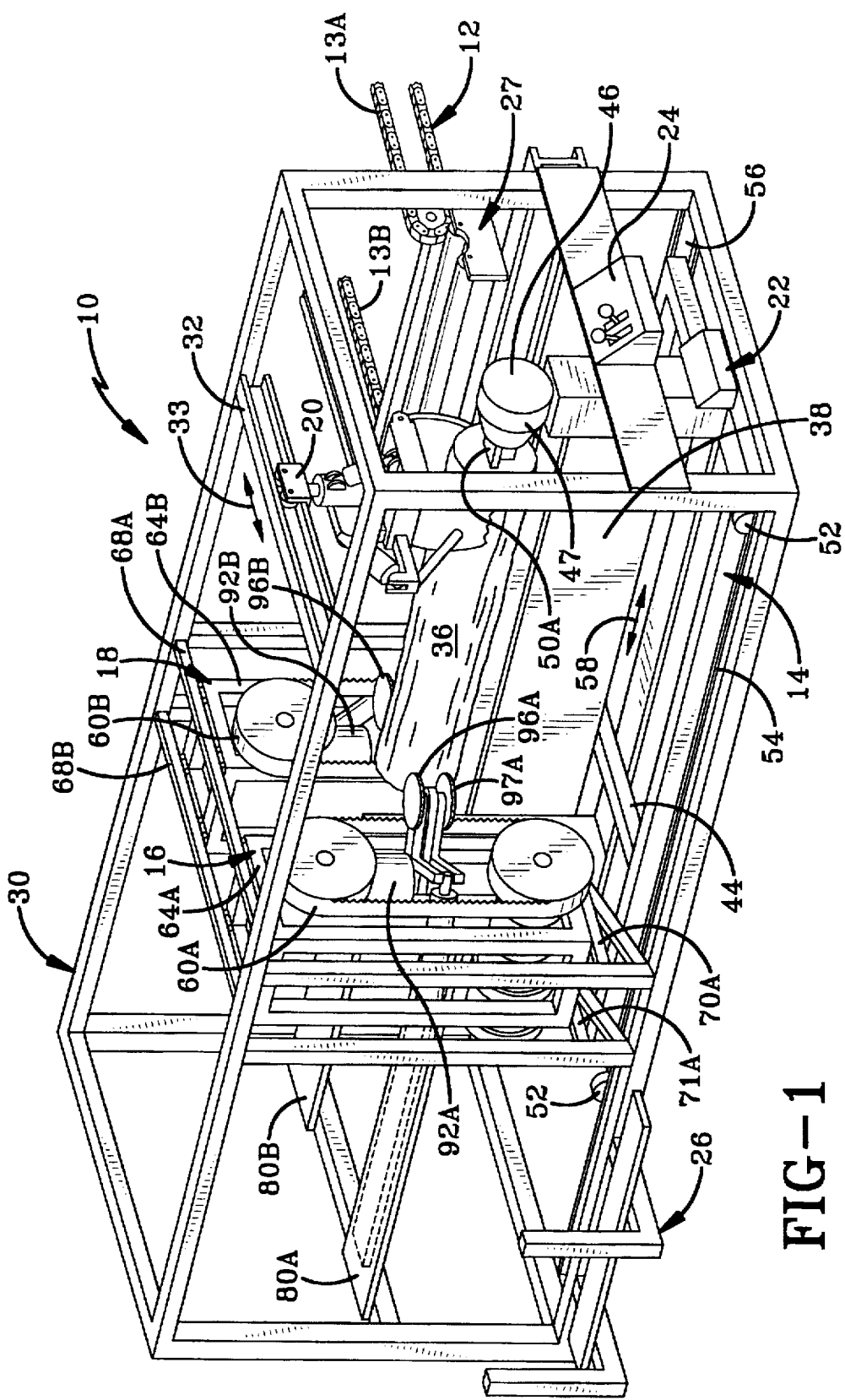
FIG. 1 is a perspective view of a first embodiment of a sawmill according to the present invention, with bandsaw positioning devices removed for clarity.
Figure 2:
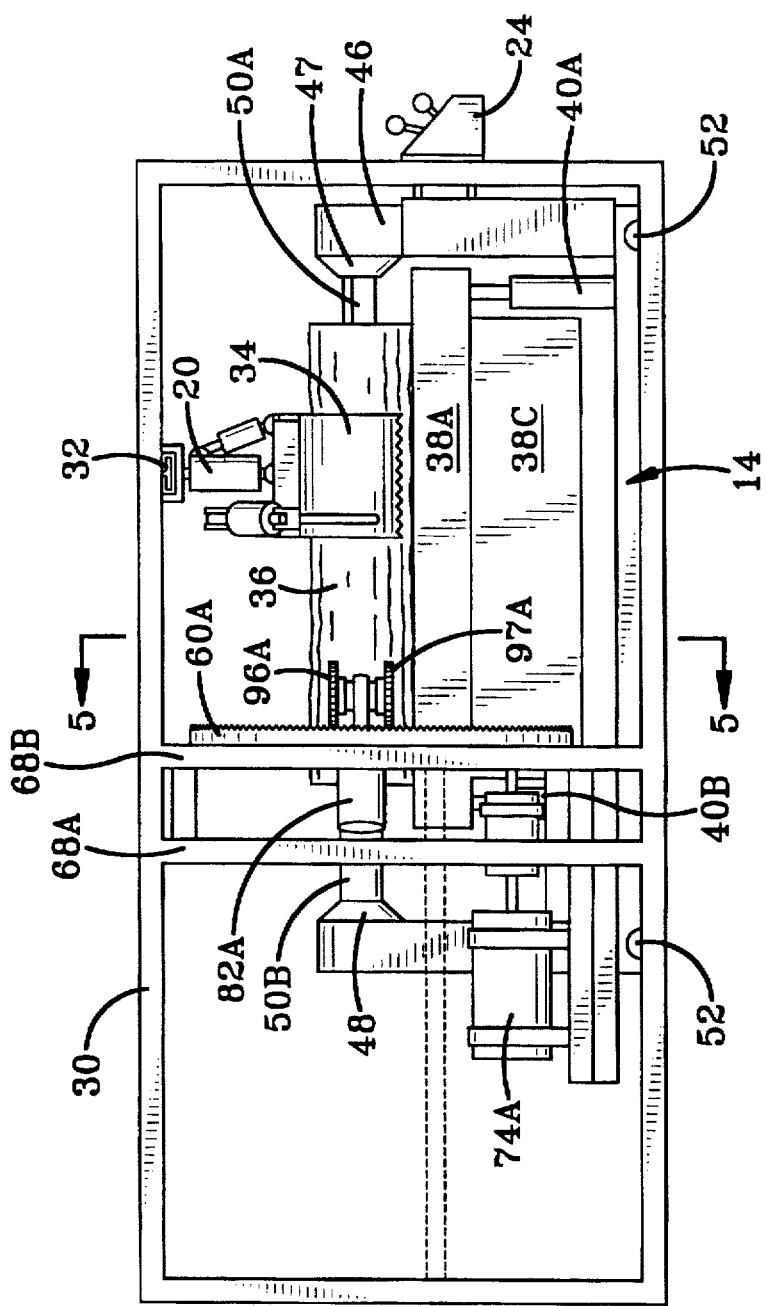
FIG. 2 is a side view of the sawmill shown in FIG. 1.
Figure 3:
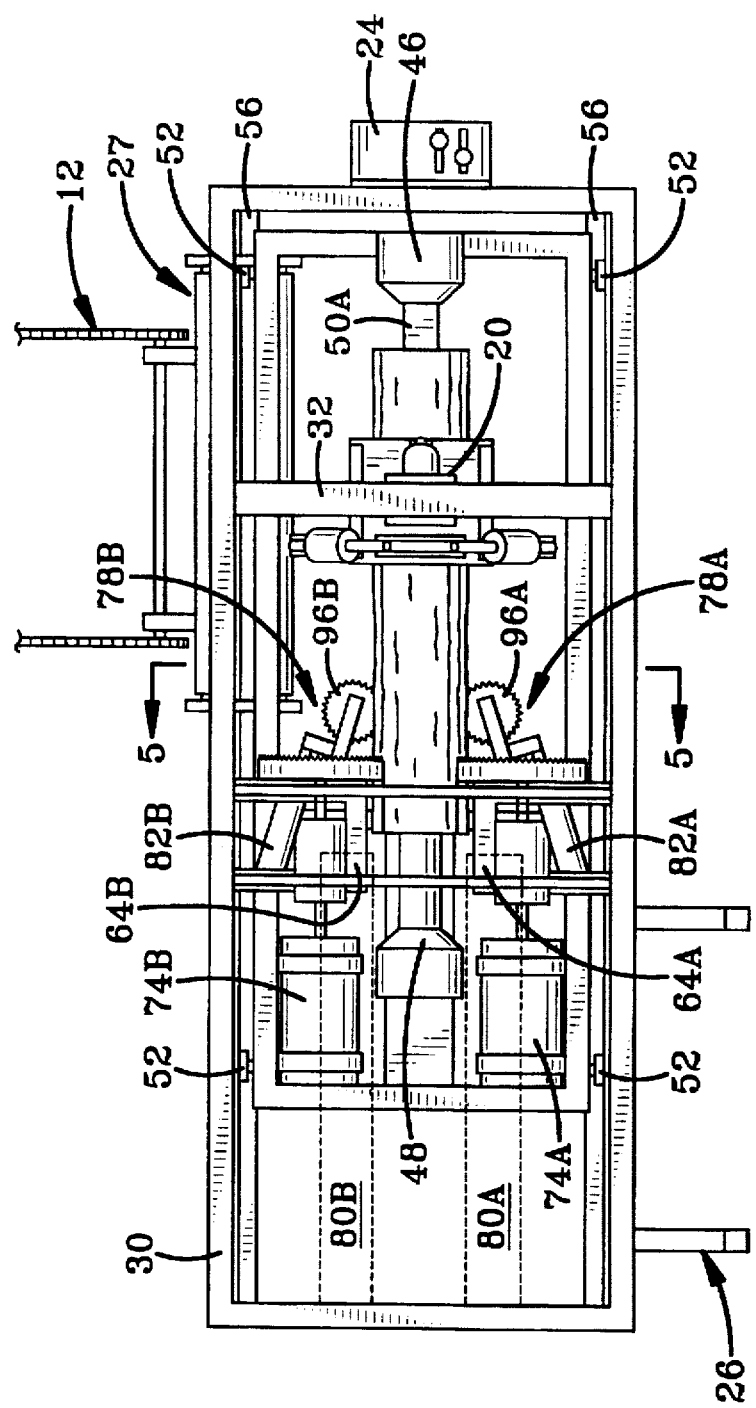
FIG. 3 is a top view of the sawmill shown in FIGS. 1 and 2, with tables shown in hidden lines for clarity.

As best seen in FIG. 1, as boards are cut from saw bolt 36, typically two during each cut, the boards and any scrap wood drop from the saw bolt onto tables 80A and 80B, the tables being adjacent the saw bolt when the saw bolt is fully extended from winch 22 after a cut. A cut board is shown in FIG. 1 on table 80A in hidden lines to designate the approximate location of the cut board when one is cut from saw bolt 36. A tail sawyer pulls the boards off of the tables 80A and 80B and stacks them, typically on a skid, for future transportation to a lumber yard. The tail sawyer also moves the scrap wood off of tables 80A and 80B and onto scrap wood holder 26 for transportation away from the immediate vicinity of the sawmill. Scrap wood holder 26 is a unit with two supports capable of receiving the scrap wood such that the scrap wood can be bound and hauled away when the scrap wood holder 26 is full.

Figure 4:
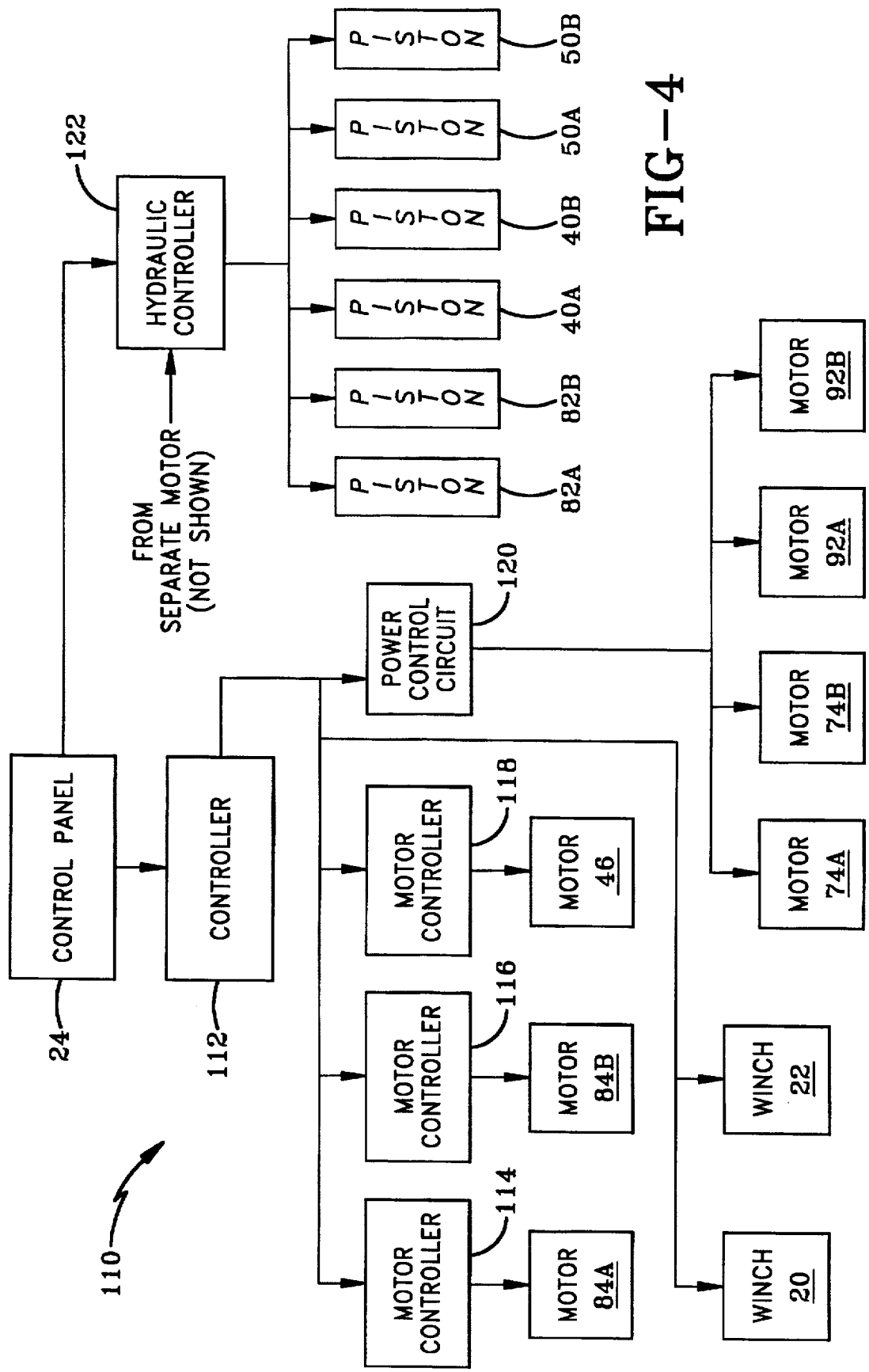
FIG. 4 is a diagram of the circuitry which connects the control panel to the motors.

FIG. 4 is a block diagram of one embodiment of a control circuit 110 for controlling sawmill 10. Control circuit 110 includes controller 112, motor controllers 114, 116, and 118, power control circuit 120, and hydraulic controller 122. Controller 112, in this preferred embodiment, is a digital computer, and is coupled to motor controllers 114, 116, and 118, as well as power control circuit 120. Motor controller 114 is coupled to the motor 84A associated with positioning mechanism 76A. Motor controller 116 is coupled to the motor 84B associated with the positioning mechanism 76B. Motor controller 118 is coupled to the rotation motor 46. The motor controllers are common, commercially available controllers. Controller 112 receives an input from the sawyer via control panel 24. Based on this input, controller 112 provides motor controller signals to the various motor controllers 114, 116, and 118. These outputs represent a desired position for motors 84A, 84B, and 46, respectively. Motor controllers 114, 116, and 118 take the motor controller signal from controller 112 (which is typically in digital form) and convert it to a motor position signal which is then provided to the associated motor. Depending on whether the motors are servo type motors or stepper motors, the position signals are formatted properly to control the motors.

Controller 112 also provides an output signal to power control circuit 120. Power control circuit 120 is coupled, at its output, to motor 74A, 74B for driving the bandsaws, and to motors 92A and 92B for driving the edging saws. Depending on the power output signal from controller 112, power control circuit 120 either couples power to the motors, or interrupts the power supply to the motors.

In one embodiment, bandsaw motors 74A and 74B are preferably forty (40) horsepower saw motors, while edging motors 92A and 92B are preferably five (5) horsepower edging motors. The motor 46 is typically an air cylinder, but may be a hydraulic cylinder or an electric motor. All of these motors are typically electric motors that receive power from a single two hundred to three hundred horsepower diesel engine (not shown) which is used typically to run the entire sawmill in the remote locations it is located. Where any of the motors 74A, 74B, 92A or 92B are gasoline fueled engines, instead of electric motors, power control circuit 120 includes an electric ignition circuit for starting and stopping the motor.

In the above mentioned embodiment, hydraulic controller 122 receives its power from a separate motor not shown but discussed as a two hundred to three hundred horsepower engine. However, in an alternative embodiment, the power for hydraulic controller 122 can be supplied by any of the other electric motors in sawmill 10, assuming they are provided with the proper outputs.

Hydraulic controller 122 is coupled to pistons 40A and 40B, and to pistons 82A and 82B. Hydraulic controller 122 receives a piston control input from the sawyer via control panel 24. Based on the piston control input, the hydraulic controller 122 controls pistons 40A and 40B to move to a desired position. In the same manner, hydraulic controller 122 receives a piston control input from the sawyer via control panel 24 to move edging saws into a cutting position or out of a cutting position.

It should also be noted that sawmill 10 can be equipped with a hitch and a set of retractable wheels (not shown) so that it can be towed behind a vehicle. This provides a desired portability. Sawmill 10 is also preferably provided with hydraulic levelers (not shown) located on the lower portion of frame 30 so that sawmill 10 can be leveled on substantially uneven terrain.

Second Major Embodiment

A sawmill in a second embodiment further contains some additional elements as well as some changes or deleted elements. All similar parts are identically numbered, otherwise new or modified parts are renumbered and described below.

One of the additional elements is a means for removal of sawdust from the sawmill. The means for removal may use either a vacuum and suction system or a blower system, where in both cases, the diesel motor powers the means for removal to cause sawdust to be displaced from the sawmill. FIGS. 8–11 show additional features which may be used separately or in combination with each other or any of the previously discussed features. Some of the previously discussed features such as winch 20 have been removed from these figures for clarity of showing other features.

Figure 8:
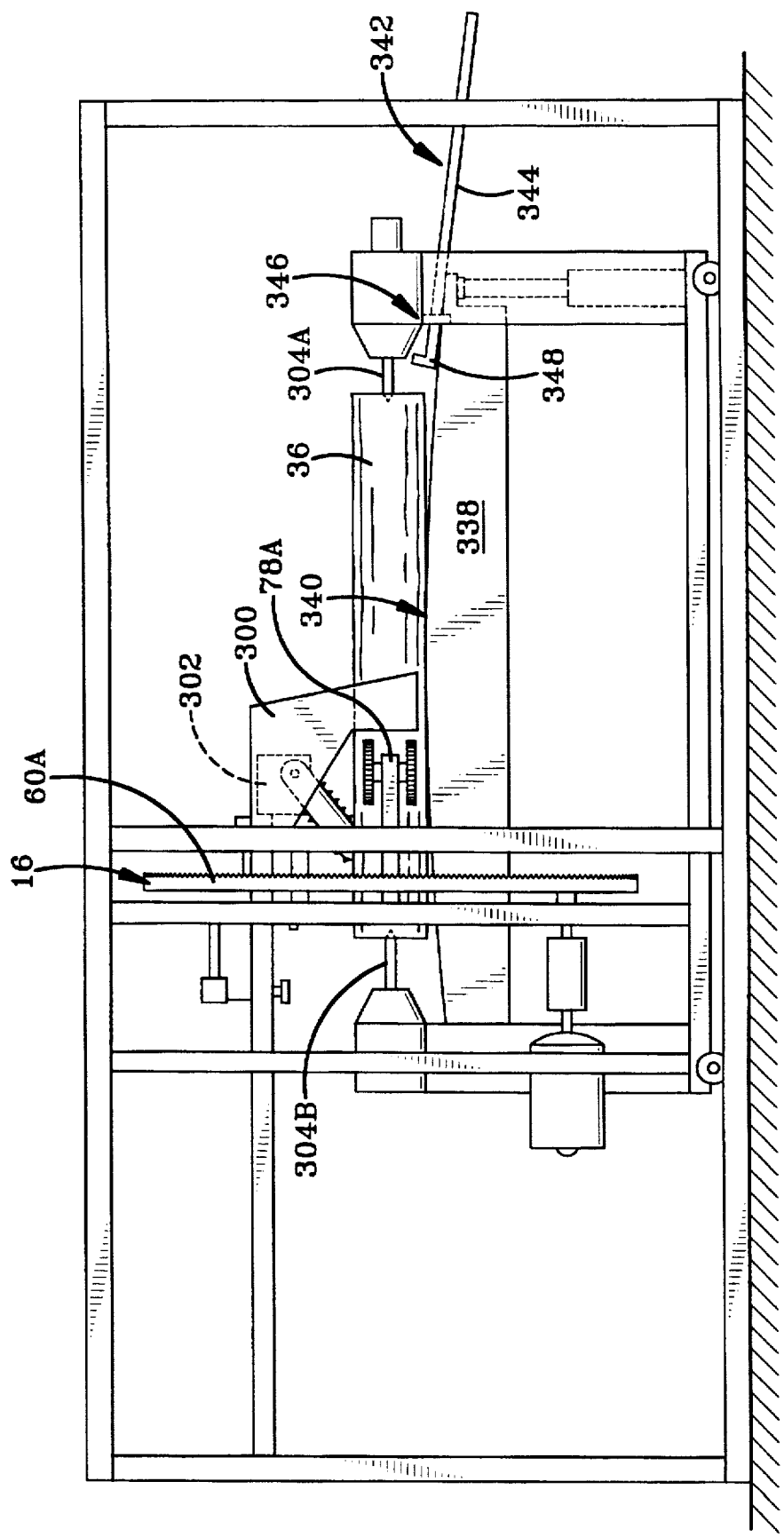
FIG. 8 is a side view of a second embodiment of a sawmill with debris/rock removing chain saws and a log end alignment mechanism.

FIG. 8 discloses a hood 300 in which a vacuum mechanism for the removal of saw dust from the sawing area is attached. Hood 300 functions as a cover for reducing the amount of saw dust in the environment away from the saw blades and as a funnel for funneling the saw dust towards the vacuum based upon its suction.

A debris, bark and rock removing mechanism 302 is connected to sawmill 10. Debris, bark and rock removing mechanism 302 is positioned within hood 300 such that the majority, if not all, of the rocks, debris, wood chips and saw dust created by debris, bark and rock removing mechanism 302 are deflected by hood 300. Specifically, the debris, bark and rock removing mechanism 302 is positioned on the bandsaw frame just below the bandsaw drive wheel and above the mounting brackets of vertical edging saws 78A and 78B, found on FIG. 3. The deflection of this debris and rocks as well as wood chips is in a downward direction for safety purposes. The vacuum mechanism in hood 300 may alternatively suction out the debris, rocks, bark and wood chips/saw dust rather than allowing it to fall downward to the ground. Debris, bark and rock removing mechanism 302 is positioned in between the bandsaw assemblies 16 and 18 and the edging saws 78A and 78B.

An alternative embodiment of the telescoping ends or plungers which engage the saw bolt 36 is shown in FIG. 8. Ends 304A and 304B are substantially planar saw bolt supports which include either a hydraulic piston or an electrically positionable actuator, with means, such as a number of spikes or teeth for sinking into and engaging saw bolt 36. In a third embodiment, only telescoping end 304A has a hydraulic piston or electrically positionable actuator for extending and retracting to engage saw bolt 36. End 304B is stationary and saw bolt 36 is positioned in contact with end 304B while telescoping end 304A extends outward and pins saw bolt 36 therebetween. Support ends 304A and 304B (FIG. 8) have been determined to be 1¼" thick×4" wide and 12" long when fully extended. The support ends 304A and 304B will be in a vertical position.

An alternative embodiment for the support member (support member 338) is also shown in FIGS. 8, and selectively provides substantial support for saw bolt 36 during milling. Typically, after saw bolt 36 has been aligned in between ends 304A and 304B, support member 338 is raised to provide extra support for the saw bolt during the milling process. However, support member 338 may be used during the alignment process if necessary to help align saw bolt 36 properly between ends 304A and 304B. Support member 338 has a curved upper edge 340 for engaging saw bolt 36. This curved upper edge 340 thus gives saw bolt 36 additional support in its midsection and allows saw bolt 36 to be balanced more evenly on support member 338 when abnormal shaped saw bolts are encountered.

An end alignment mechanism 342 also helps to align saw bolt 36 in between ends 304A and 304B. End alignment mechanism 342 includes an elongated shaft or lever 344 which acts as a fulcrum about a connection point 346. Connection point 346 may merely define an opening through which end alignment mechanism 342 is slidable and movable in any angular direction, or may be a ball and socket fitting in which elongated lever 344 is slidable and angularly adjustable. End alignment mechanism 342 further includes a log engaging portion 348 which typically contains a curved face 390 for better support of saw bolt 36 during movement of its end (see FIG. 12). The elongated lever 344 is of substantial length such that it may act as a fulcrum about connection point 346 thereby allowing a sawyer to lift a saw bolt 36 of substantial weight with log engaging portion 348.

Figure 9:
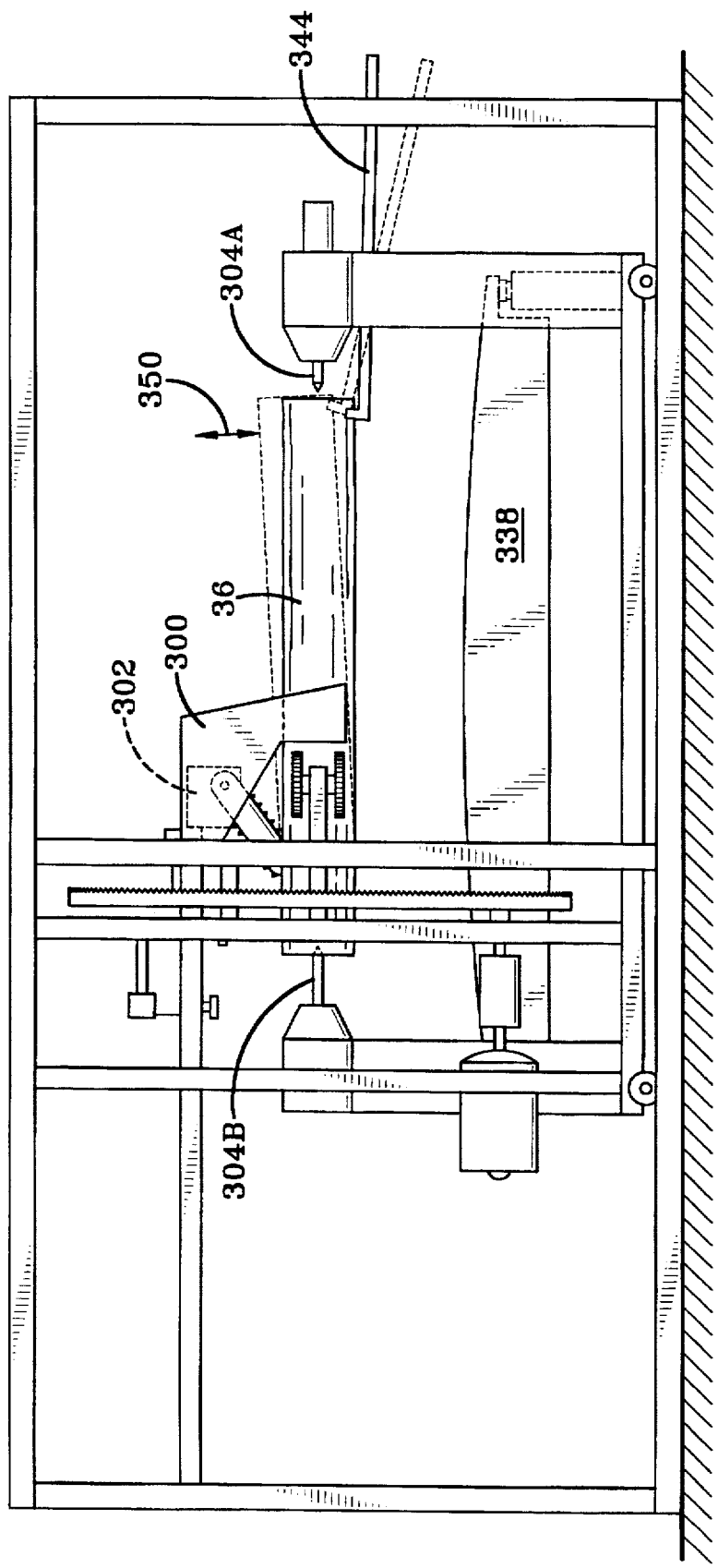
FIG. 9 is the same side view as FIG. 8 and further shows the log end alignment mechanism adjusting the log position.

Occasionally, the saw bolt is not properly positioned within the carriage assembly and it may be necessary to loosen one end of the saw bolt from the carriage assembly and adjust its location, position, height, etc. FIG. 9 shows elongated lever 344 moving saw bolt 36. Saw bolt 36 is shown moving vertically by arrow 350. Elongated lever 344 is shown lifting saw bolt 36 from the solid line position up to the dashed line position. Support member 338 is shown disengaged from saw bolt 36 during this adjustment process. This adjustment process allows one end of the saw bolt to be properly aligned with end 304B and engaged, while the other end of the saw bolt is adjusted accordingly by elongated shaft or lever 344 so that end 304A properly aligns with end 304B, i.e., such that each of the ends is substantially centered on the corresponding saw bolt end.

Figure 10:
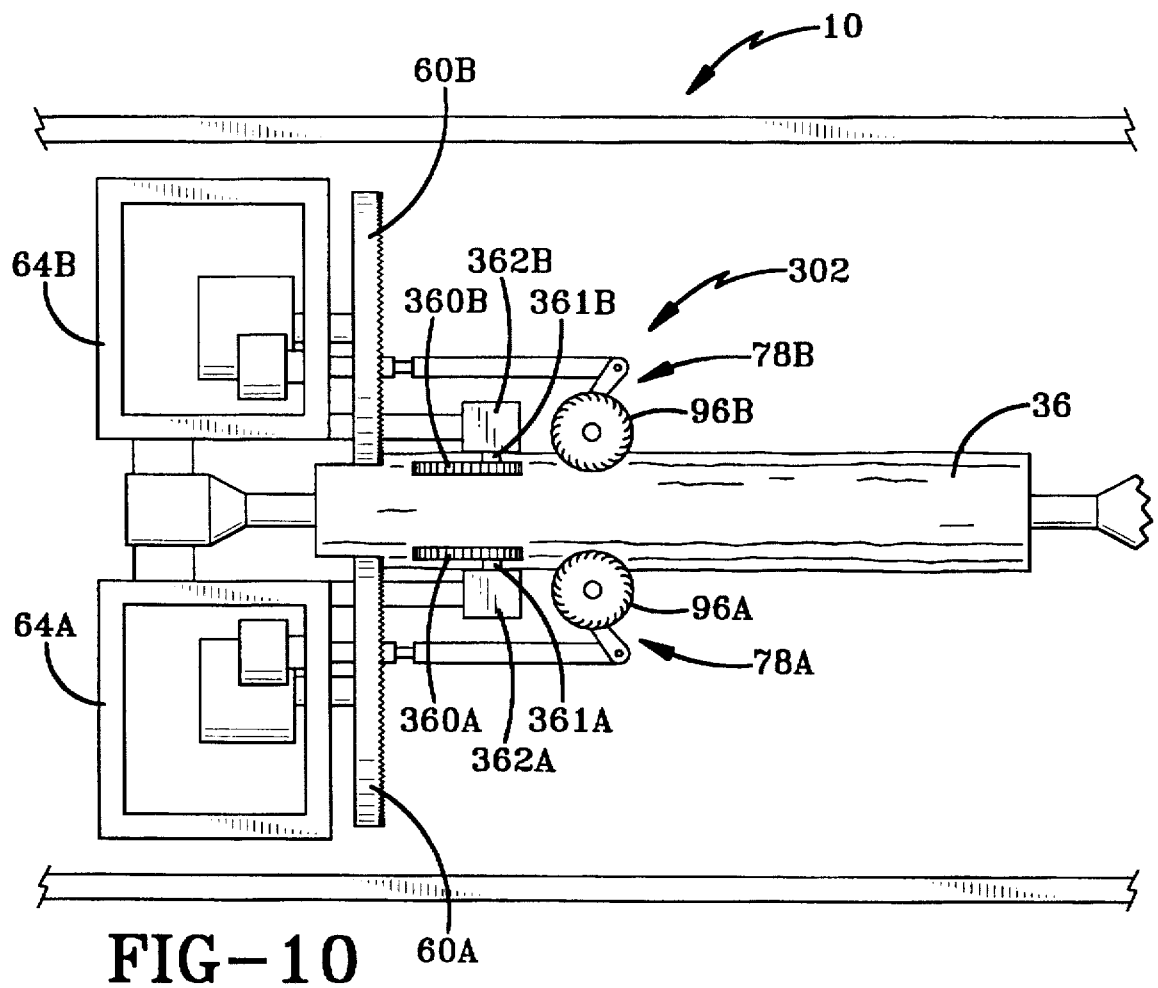
FIG. 10 is top view of the debris/rock removing chain saws with the hood removed.

The debris, bark and rock removing mechanism 302 is shown in more detail in FIG. 10. Debris and rock removing mechanism 302 includes a first hydraulic motor driven chain saw 360A and a second chain saw 360B, where each of these chain saws is attached to frames 64A and 64B in such a manner that the cutting blades on chain saws 360A and 360B are in direct alignment with bandsaw blades 60A and 60B. In more detail, chain saws 360A and 360B are mounted to frames 64A and 64B using swing arms or brackets 362A and 362B where each swing arm is adjustable by hydraulic control up or down from the non-cutting position to the cutting position by the sawyer.

Chain saws 360A and 360B are each positioned in between an edger saw (78A and 78B, respectively) and a bandsaw (60A and 60B, respectively). As saw bolt 36 is advanced through sawmill 10, the edger saws 78A and 78B are engaged first. After the edger saws 78A and 78B have cut that portion of saw bolt 36, that portion advances such that chain saw 360A and 360B place a cut or key in saw bolt 36. The chain saws are positioned on the top portion of saw bolt 36 only because bandsaws 60A and 60B cut such that the teeth rotate down through saw bolt 36 from the top to the bottom. Therefore, the chain saws which remove debris and rock are only needed on the top side of saw bolt 36 because any debris or rock on the bottom side of saw bolt 36 will have fallen off prior to cutting or be easily moved out the way by bandsaws 60A and 60B as they extend away from saw bolt 36. However, on top of saw bolt 36, any debris or rocks that bandsaws 60A and 60B encounter will dull the blade and tend to jam the blade as the blade enters into saw bolt 36.

Chain saws 360A and 360B are spring loaded down by springs on shafts 361A and 361B on swinging arms or brackets 362A and 362B such that the saw blades are always in contact with saw bolt 36. A pre-set amount of downward tension is placed on the chain saws to result in a certain key cut depth. The motion of saw bolt 36 through the cutting process tends to urge chain saws 360A and 360B upward. However, springs on shafts 361A and 361B in each swinging arm 362A and 362B opposes this urging such that the chain saws 360A and 360B are kept in contact with saw bolt 36. The chain saws 360A and 360B are adjustable both in terms of location and depth of cut. However, typically chain saws 360A and 360B will be connected to first and second bandsaw assemblies 16 and 18, respectively. This direct connection allows chain saws 360A and 360B to be adjusted simultaneously with bandsaw assemblies 16 and 18, respectively.

The chain saws 360A and 360B take out a key of bark on the top of saw bolt 36 as well as remove any debris or rocks that may have been lodged in or laying on top of the bark. The key that chain saws 360A and 360B cut out is in direct alignment with bandsaws 60B and 60A, respectively. This allows bandsaws 60A and 60B to cut downward into the key where no debris or rocks exist thereby prolonging the life and sharpness of bandsaws 60A and 60B.

As the logs or saw bolts line up on the conveyance skidway 12, it is likely that the ends of the logs will not form a straight or even line. Therefore, it is necessary to move each log, such that the winch moving the log from skidway 12 and saw bolt rotating holder or table 27 to a cutting position in between ends 304A and 304B and on support member 338, engages the saw bolt in substantially the center portion so that each of the ends of the saw bolt will be close to alignment with ends 304A and 304B.

A longitudinal alignment mechanism 370 forces the saw bolts in between a pair of drums 372A and 372B. The rotation of the drums 372A and 372B is shown by arrows 374A and 374B. This rotation forces the logs inward through a channel between the rotating drums 372A and 372B. After the saw bolt has passed through this channel, the saw bolt is properly aligned such that the winch will engage the saw bolt in substantially its midsection and can move along slide 32 to a position where cylinder 222 is extendable in a vertical direction downward so that the saw bolt in the winch can be engaged by a pair of ends such as 304A and 304B.

The rotating drums 372A and 372B also act as a barricade which limits the number of saw bolts on saw bolt rotating holder or table 27 to one. This occurs because the saw bolts may not pass through the channel between rotating drums 372A and 372B unless the drums are actuated to rotate. This prohibition from passing through the channel is caused by springs 376A and 376B which pull rotating drums 372A and 372B inward. The rotating drums 372A and 372B are connected to power skidway 12 and are pivotable about connection points 378A and 378B. Springs 376A and 376B are in tension and thus pull drums 372A and 372B toward one another.

Limit guides 380A and 380B define a range within which rotating drums 372A and 372B may pivot about connection points 378A and 378B, respectively. Limit guides 380A and 380B are connected to sawmill 10. Each of the limit guides 380A and 380B contains an inner limit 382A and 382B, respectively, which prohibit spring 376A and 376B, respectively, from pulling drums 372A and 372B any closer together, and an outer limit 384A and 384B, respectively, which prohibit saw bolts larger than a pre-set length from passing between rotating drums 372A and 372B.

Figure 12:
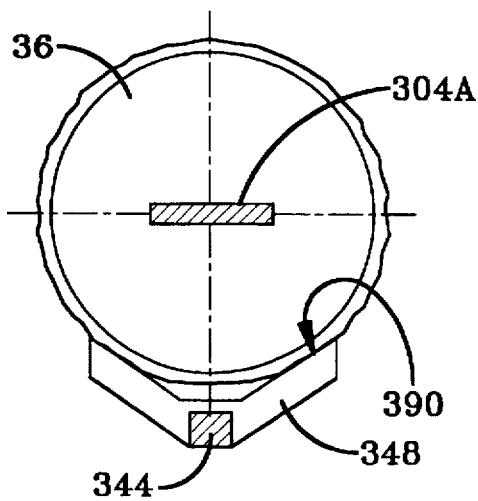
FIG. 12 shows the end of a length of sawbolt with an alternative embodiment of the telescoping end engaging the log and with the log alignment mechanism holding the log up.

FIG. 12 shows the dimension and shape of end 304A. This is in comparison to the first embodiment for the ends, as is shown in FIG. 13, which is a T-shaped telescoping end 50A. FIG. 12 also shows elongated lever 344 and log engaging portion 348. The shape of log engaging portion 348 is clearly shown as a curved face 390 for better holding saw bolt 36.

Numerous motors and/or positioners are needed to move various parts including the saws and carriage. Various methods of moving, i.e. positioning with relation to other parts, and driving, i.e., rotating saws, the saws may be used including systems based upon air, hydraulic fluids and/or electric. Although any of these may be used, hydraulic equipment is preferable, particularly on sawmills to be used in the North during the harsh winters.

Third Major Embodiment

A sawmill in a third embodiment further contains some additional elements as well as some changes or deleted elements. All similar parts are identically numbered, otherwise new or modified parts are renumbered and described below.

As illustrated in FIGS. 14–15, a third embodiment of a sawmill includes a log rotating, transferring, and centering mechanism 400. This mechanism is inserted into the above described sawmill in the second embodiment in between the skidway 12 and carriage assembly 14. Specifically, this log rotating, transferring, and centering mechanism 400 replaces winch 20, rotating assembly or holder 27, end alignment mechanism 342, and longitudinal alignment mechanism 370.

The most preferred embodiment of a sawmill includes conveyance skidway 12, a saw bolt carriage 14, a first and a second bandsaw assembly 16 and 18, respectively, at least one winch 22, a control panel 24, and a scrap wood holder 26. In addition, a rotating, centering, and transfer assembly or holder may be integral with or selectively attached to the sawmill for providing saw bolts or logs to the sawmill as disclosed preferably as mechanism 400, although winch 20, rotating assembly or holder 27, end alignment mechanism 342, and longitudinal alignment mechanism 370 will also serve a similar function. Log rotating, transferring, and centering mechanism 400 is described in more detail below.

The sawmill is operated using only one head sawyer and one tail sawyer, that is, two persons working in the sawmill. The principal operator of sawmill 10, typically referred to as the "sawyer" or "head sawyer", stands adjacent to the control panel 24 which includes a controller (such as a digital computer) or microprocessor for controlling the motors and actuators of sawmill 10. The head sawyer's primary function is to operate the carriage 14 in the sawing of lumber.

A second sawyer, or "tail sawyer" assists the head sawyer by removing lumber and waste from the saw. In addition, in the most preferred embodiment where rotating, transferring, and centering mechanism 400 is present, the tail sawyer operates the assembly 400 which is typically operated by remote control.

Saw bolts are introduced to sawmill 10 by conveyance skidway 12 as described above in the first embodiment where the skidway is driven so that the saw bolts are moved adjacent frame 30 of sawmill 10 and positioned there for milling as needed such that the next saw bolt to be milled is positioned on rollers 401 and 401A as described below in log rotating, transferring, and centering mechanism 400 by skidway 12. Specifically, the log rotating, transferring, and centering device 400 shown in detail in FIG. 14 as used on the sawmill in FIGS. 1–13 in replacement of winch 20, rotating assembly or holder 27, end alignment mechanism 342, and longitudinal alignment mechanism 370, is positioned at the end of skidway 12 such that a saw bolt on skidway 12 rolls off of the skidway and onto the rollers 401 and 401A when the skidway is accordingly started and stopped to advance one saw bolt.

As the logs or saw bolts line up on the conveyance skidway 12, it is likely that the ends of the logs will not form a straight or even line. Therefore, it is necessary to align and move each saw bolt so that the saw bolt is roughly centered and properly oriented when it is introduced into the sawmill. In the preferred embodiment, one of the sawyers controls the introduction of the saw bolts to the carriage 14 using log rotating, transferring, and centering assembly 400 which is controlled from control panel 24. The result of the introduction process is that a saw bolt or log is positioned on carriage assembly 14, and more particularly so that the saw bolt may rest upon support member 38, which is part of carriage assembly 14.

The saw bolt rotating, transferring, and centering mechanism 400 is shown in FIGS. 14 and 15. This assembly includes a log rotator mechanism with rollers 401 and 401A, a log centering clamp mechanism with a pair of arms 405 and 406 that each have a set of fingers 402 and 402A, and 403 and 403A, respectively connected to the ends thereof, a log rotator drive motor 404, a level indicator 407, drive gears 408A and 408 for each pair of arms 405 and 406, and an adjustable stop 409A and 409 for each pair of arms 405 and 406.

In an alternative embodiment, the longitudinal alignment mechanism 370 as described above is used adjacently upstream of the rotating, transferring, and centering mechanism 400 to force the saw bolts in between a pair of drums 372A and 372B thereby aligning the logs prior to the logs entering the rotating, transferring, and centering mechanism 400.

In operation, power skidway 12 and drums 372A and 372B, if used, are actuated so that a single saw bolt moves from the power skidway onto rollers 401 and 401A. The saw bolt is aligned lengthwise with the rollers due to the log alignment caused by the forcing of the saw bolt between the rotating drums 372A and 372B. After the saw bolt is positioned on the rollers, motor 404 drives the rollers such that the saw bolt is rotated to a desired position such that the best wood recovery will occur when the saw bolt is milled.

After the log is properly positioned by the rollers 401 and 401A, arms 405 and 406 rise such that the ends of the saw bolt nest or cradle within the C-shaped log receiving end of each arm. The drive gears 408 and 408A, which move each of the fingers 402 and 402A, and 403 and 403A, separately, in and out of the arm thereby adjusting its position with relation to both the corresponding arm and the corresponding other finger in the pair, are actuated such that the saw bolt is secured between the fingers 403 and 403A, and 402 and 402A. Specifically, the drive gears control movement of both of the fingers on each arm such that the distance relationship between the fingers is adjustable so as to allow selective securing of the saw bolt as well as selective release of the saw bolt, as well as to allow positioning adjustment of the saw bolt.

The saw bolt is transferred into the carriage 14. Specifically, the saw bolt moves from the position of fingers 402, 402A, 403 and 403A shown in FIG. 14 to that of fingers 402, 402A, 403 and 403A as shown in FIG. 15, i.e., the saw bolt is lift off of the rollers 401 and 401A and transferred over until the saw bolt is hanging from the arms 405 and 406. The saw bolt is adjusted by the sawyer controlling the assembly 400 and specifically the arms 405 and 406 until the saw bolt is properly centered between the telescoping ends 50A and 50B.

As described above for the other embodiments, carriage assembly 14 includes support member 38, a pair of hydraulic pistons, 40A and 40B, a carriage 44, an electrically controllable drive motor 46, a gear drive box 47 supported by a support 411, bearings 48 (see FIG. 2), and a pair of telescoping ends, 50A and 50B (see FIG. 2), for engaging the saw bolt 36 positioned between them.

The support member in this embodiment may either consist of three iron plates, namely a center support 38A, and two supplemental supports 38B and 38C (see FIG. 5), or a single center plate 338 (see FIG. 8). Once saw bolt 36 is resting upon support member 38 or 338, the operator then may actuate pistons 40A and 40B as described above to raise or lower center support 38A or support member 338 so that saw bolt 36 is generally between telescoping end 50A and telescoping end 50B. The sawyer operates control panel 24 to cause the telescoping ends 50A and 50B to engage the respective ends of saw bolt 36. Once the saw bolt 36 has been engaged, the sawyer disengages or opens jaws 402 and 402A, and 403 and 403A. The sawyer then may actuate pistons 40A and 40B to raise support 38 to further stabilize sawbolt 36 as needed. Supports 38B and 38C (see FIG. 5) are immovable parts of the main carriage and the only purpose thereof is to serve as a guide for center support 38A and to structurally strengthen the carriage.

The carriage 44, winch 22, saws (16, 18, 78A, 78B, 360A, and 360B), hood 300, the saw positioning mechanisms, motors, tracks, etc. and other elements involved in saw bolt advancement and cutting are identical to those described above and are incorporated herein.

In conclusion, the present invention is a portable sawmill which provides significant advantages over the prior art. First, the present invention has semi-automatic positioning mechanisms for positioning the multiple bandsaws and synchronic assemblies relative to one another. In addition, the present invention has the edging saws (preferably pairs of parallel circular edger saws) physically connected to the bandsaw assemblies so that each movement of the bandsaw assembly does not require repositioning of the edging saw relative to the bandsaw assembly. Rather, each movement of the bandsaw assembly causes a corresponding movement of the edging saw either mechanically by pivotal connection, or electro-mechanically by controller instruction to a mechanical moving mechanism. This essentially eliminates misalignment between the two saws, and greatly decreases the time for moving the bandsaw assemblies and edging saw assemblies. The present invention also provides a rotatable connection between the sawmill 10 and the saw bolts being milled. This allows the saw bolts being milled to be rotated, to any given degree, with very little effort and this improves the quality of the final product lumber. This provides quick and efficient movement in positioning of the saw bolts being milled relative to sawmill. The present invention further provides a debris and rock removing mechanism consisting of chain saws for cutting a key for each of the bandsaws to follow therein. This significantly reduces dulling of the blade and/or jamming of the system due to rocks and debris on the upper portion of the saw bolt. Finally, various saw bolt alignment mechanisms for aligning the saw bolts on the skidway, including the log rotating, transferring, and centering mechanism, and in between the engaging and/or telescoping ends are described such that the largest quantity of lumber, i.e., the least amount of waste from a board, can be reached in a quick and efficient manner.

Clearly, the present invention provides significantly improved productivity, efficiency and versatility. Specifically, the present invention allows the sawyers to maximize lumber production while minimizing waste, cost and manpower.

Although the present invention has been described with reference to preferred embodiments, workers skilled in the art will recognize that changes may be made in form and detail without departing from the spirit and scope of the invention. Obviously, modifications and alterations will occur to others upon a reading and understanding of this specification. It is intended to include all such modifications and alterations insofar as they come within the scope of the appended claims or the equivalents thereof.

What is claimed is:

1. A sawmill for milling a length of sawbolt, the sawbolt having a first end and a second end and a longitudinal axis running generally between the first and second ends, the sawmill comprising:

a frame;

a sawbolt providing mechanism adjacent to the frame for supplying lengths of sawbolt to be milled;

a sawbolt rotation mechanism, mounted on the frame, for rotating the length of sawbolt about its longitudinal axis;

a sawbolt engaging, transferring and centering mechanism movably attached to the frame, the sawbolt engaging, transferring and centering mechanism for adjustably centering the length of sawbolt and transferring the length of sawbolt from the sawbolt providing mechanism to a sawbolt securing mechanism;

the sawbolt securing mechanism attached to a carriage, the sawbolt securing mechanism for securably and rotatably supporting and holding the length of sawbolt during the milling process;

the carriage movably mounted within the frame, the carriage being mounted for movement along a cutting path;

a carriage positioning mechanism, coupled to the frame and the carriage, for moving the carriage along the cutting path relative to the frame and relative to first and second bandsaws;

the first bandsaw movably mounted to the frame;

the second bandsaw movably mounted to the frame, and the second bandsaw movably mounted in relation to the first bandsaw;

first and second bandsaw positioning mechanisms attached to the frame, and to the first and second bandsaws, respectively, the bandsaw positioning mechanisms for causing movement of the respective first and second bandsaws relative to the carriage, relative to the other of the first and second bandsaws, and toward and away from the cutting path;

a first edging saw coupled to and with the first bandsaw and having a pair of substantially parallel circular saw blades which are non-planar with respect to a blade of the first bandsaw, the first edging saw being movable along with the first bandsaw to which it is coupled;

a second edging saw coupled to with the second bandsaw and having a pair of substantially parallel saw blades which are non-planar with respect to a blade of the second bandsaw, the second edging saw being movable along with the second bandsaw to which it is coupled;

at least one debris and rock removing mechanism attached to a respective one of the bandsaws, the debris and rock removing mechanism for removing debris and rocks from the sawbolt during the milling of the length of sawbolt by the bandsaws and edging saws; and, a controller, coupled to the at least the sawbolt engaging, transferring and centering mechanism, the sawbolt securing mechanism, the carriage, the carriage positioning mechanism, the bandsaws, the bandsaw positioning mechanism, and the edging saws.

2. The sawmill as set forth in claim 1 wherein the sawbolt providing mechanism includes a skidway adjacent to the frame for supplying the length of sawbolt to be milled.

3. The sawmill as set forth in claim I wherein the sawbolt rotation mechanism includes a pair of elongated rollers rotatably affixed to the frame for rotatably supporting the length of sawbolt.

4. The sawmill as set forth in claim 1 wherein the sawbolt engaging, transferring and centering mechanism includes a pair of arms pivotably affixed to the frame, a pair of fingers extending from each arm and adjustably movable in an extendable and retractable manner both in relation to one another so as to adjust a first distance separating the fingers in each pair and in relation to the respective arm so as to adjust a second distance between the pair of fingers and the respective arm.

5. The sawmill as set forth in claim 4 further comprising an arm stop attached to the frame, the arm stop for prohibiting further pivoting of the arm during transfer of the length of sawbolt.

6. The sawmill as set forth in claim 5 further comprising drive gears, each drive gear connected to a respective one of the arms and to a respective one of the pair of fingers.

7. The sawmill as set forth in claim 6 further comprising a level indicator attached to at least one of the arms, the level indicator for indicating the position of the respective arm.

8. The sawmill as set forth in claim 1 wherein the sawbolt securing mechanism includes a pair of opposed timber engagers attached to the carriage, the timber engagers for separately engaging opposing ends of the length of saw bolt positioned therebetween for securably and rotatably supporting and holding the length of sawbolt during the milling process.

9. The sawmill as set forth in claim 1 wherein the bandsaw positioning mechanism includes a ball screw attached to each bandsaw where in each ballscrew is threadedly engaged with a respective motor fixed to the frame and coupled to one such that when the motors are actuated the ball screws move the bandsaws transversely of the cutting path.

10. The sawmill as set forth in claim 1 further comprising first and second edging saw positioning mechanisms attached to the first and second bandsaws, respectively, each edging saw positioning mechanism further being attached to a respective one of the edging saws for causing separate movement of each edging saw relative to the cutting path and relative to the other of the first and second edging saws.

11. The sawmill as set forth in claim 10 wherein each edging saw positioning mechanism includes a fluid driven cylinder coupled to the respective edging saw and to the respective bandsaw such that when the driven cylinder is actuated the cylinder pivots the respective edging saw in relation to the respective bandsaw.

12. The sawmill as set forth in claim 1 wherein the debris and rock removing mechanism comprises:

a first chain saw assembly attached to the first bandsaw, the first chain saw assembly including a first chain saw mounted for movement with respect to the first bandsaw toward and away from the cutting path; and a second chain saw assembly attached to the second bandsaw, the second chain saw assembly including a second chain saw mounted for movement with respect to the second bandsaw toward and away from the cutting path.

13. The sawmill as set forth in claim 1 further comprising a hood means for coupling to a vacuum mechanism for the removal of saw dust from the milling area.

* * * * *